(12) United States Patent
Hatcher et al.

(10) Patent No.: US 6,959,429 B1
(45) Date of Patent: Oct. 25, 2005

(54) SYSTEM FOR DEVELOPING DATA COLLECTION SOFTWARE APPLICATIONS

(75) Inventors: Brenda G. Hatcher, Mount Airy, MD (US); Bruce E. Watterson, Sammamish, WA (US); Paul R. Clark, Gig Harbor, WA (US)

(73) Assignee: Watterson-Prime Software, Inc., Bellevue, WA (US)

( * ) Notice: Subject to any disclaimer, the term of this patent is extended or adjusted under 35 U.S.C. 154(b) by 0 days.

(21) Appl. No.: 09/572,020

(22) Filed: May 16, 2000

(51) Int. Cl.$^7$ .............................. G06F 9/44; G06F 7/00
(52) U.S. Cl. .................... 717/109; 717/113; 707/104.1
(58) Field of Search ............................... 717/109, 113; 707/104.1

(56) References Cited

U.S. PATENT DOCUMENTS

| | | | | |
|---|---|---|---|---|
| 3,614,744 A | * | 10/1971 | Sweeney ........................ 707/5 |
| 4,774,661 A | * | 9/1988 | Kumpati ......................... 707/3 |
| 5,446,878 A | * | 8/1995 | Royal ............................. 714/1 |
| 5,455,948 A | * | 10/1995 | Poole et al. ................. 707/102 |
| 5,692,206 A | * | 11/1997 | Shirley et al. ............... 715/531 |
| 5,721,911 A | * | 2/1998 | Ha et al. ..................... 707/100 |
| 5,815,717 A | * | 9/1998 | Stack .......................... 717/105 |
| 5,903,889 A | * | 5/1999 | de la Huerga et al. ..... 707/104.1 |
| 5,950,201 A | * | 9/1999 | Van Huben et al. .......... 707/10 |
| 5,966,533 A | * | 10/1999 | Moody ........................ 717/100 |
| 6,006,242 A | * | 12/1999 | Poole et al. ................. 715/531 |
| 6,014,632 A | * | 1/2000 | Gamble et al. ................. 705/4 |
| 6,167,405 A | * | 12/2000 | Rosensteel et al. ......... 707/102 |
| 6,226,675 B1 | * | 5/2001 | Meltzer et al. ............. 709/223 |
| 6,260,044 B1 | * | 7/2001 | Nagral et al. ............... 707/102 |
| 6,434,567 B1 | * | 8/2002 | De La Huerga ............ 707/102 |
| 6,549,890 B2 | * | 4/2003 | Mundell et al. .............. 705/10 |
| 6,578,000 B1 | * | 6/2003 | Dodrill et al. .............. 704/270 |
| 6,665,657 B1 | * | 12/2003 | Dibachi ......................... 707/3 |

* cited by examiner

*Primary Examiner*—Wei Y. Zhen
*Assistant Examiner*—Qamrun Nahar
(74) *Attorney, Agent, or Firm*—Jensen & Puntigam, P.S.

(57) ABSTRACT

A software system for creating new data collection applications for processing input data. User information is provided through a series of screen interfaces to a first program portion, which uses a series of templates to construct an information structure. The new application contains no code but only functional information. The information provided by the user is stored in a data dictionary. A second program portion interprets and accesses the information structure created by the first program portion in order to process input data provided by the user. Certain parts/functions of the information structure can be modified, by both the first and second program portions.

29 Claims, 36 Drawing Sheets

Figure 17

SYSTEM FOR DEVELOPING DATA COLLECTION SOFTWARE APPLICATIONS

TECHNICAL FIELD

This invention relates generally to software development systems, i.e. software development tools, and more specifically concerns such a software system for developing specific data collection software applications.

BACKGROUND OF THE INVENTION

Software application development tools and methods have evolved and improved quite dramatically since their origin. Even with the latest software development tools and methods, however, it is still difficult to produce a working data collection software application (a computer program concerned with data collection) in less than six to nine months. The term "data collection application" as used herein refers to a software-based system for acquiring and evaluating information. Such applications are used for due diligence investigations, internal audits, compliance reviews in various fields, document tracking and other applications which involve the collection and evaluation of data which is in the form of data records.

The process of producing a new data collection application (the software) has in the past typically involved a number of skilled people, including a software developer, a database administrator and a project lead, as well as test personnel and resources. With the increased pace of change in both the public and private sectors, there is an increasing demand for new data collection application software that can be developed faster and at less expense than previously.

Software development in general has taken two different directions in attempting to keep pace with the increased demands for new application specific software. The first line of development is directed toward generating a large number of small, individually self-contained applications limited to a single data storage system. While this approach reduces the software development time for each application, there are issues, not surprisingly, of data integrity with this approach, as well as multiple entry requirement issues and possible problems concerning the sharing of data between two or more applications.

While such arrangements are workable in a general sense, the storage systems for such an approach typically include data structures which are not easily changed, and further, the overall system requires highly skilled software specialists dedicated to maintenance of the software for the several applications. Still further, this approach does not take into account the increasing demand for a rapid change capability in a particular data collection application in both function and data structure.

In a second approach, evolving application needs are anticipated by creating a data structure which includes every data element believed to be required by a particular application, both now and in the anticipated future. This data structure approach usually involves a large number of data collection screens by which the large set of data elements are captured. This latter approach is generally viewed as quite cumbersome; further, it does not address the potential introduction of new data elements which may require changes to existing screens, or changes to existing application "rules", guidelines and requirements for the data.

Hence, there is a need for a different approach to application software development for data collection applications, as well as a need to ensure that the individual application structure is sufficiently flexible and adaptable that it can be readily modified to meet changes in the particular operating conditions and/or desired functions of the application.

DISCLOSURE OF THE INVENTION

Accordingly, the present invention is a software system for developing new computer-based data collection applications, comprising: a first software program portion for developing an information structure which includes information covering several components, namely, data elements, data screens and rules for processing data and performing calculations thereon, said information being supplied by an end user of the new data collection application; means for developing and maintaining data storage for input data which is provided by an end user for the data collection application; and a second software program portion for interpreting and accessing the information structure developed by the first software program portion for processing the input data in accordance with the information structure.

BRIEF DESCRIPTION OF THE DRAWINGS

FIGS. 15–17 are interface screens to permit the user to define the flow chart of FIG. 14.

BEST MODE FOR CARRYING OUT THE INVENTION

Figure 1:
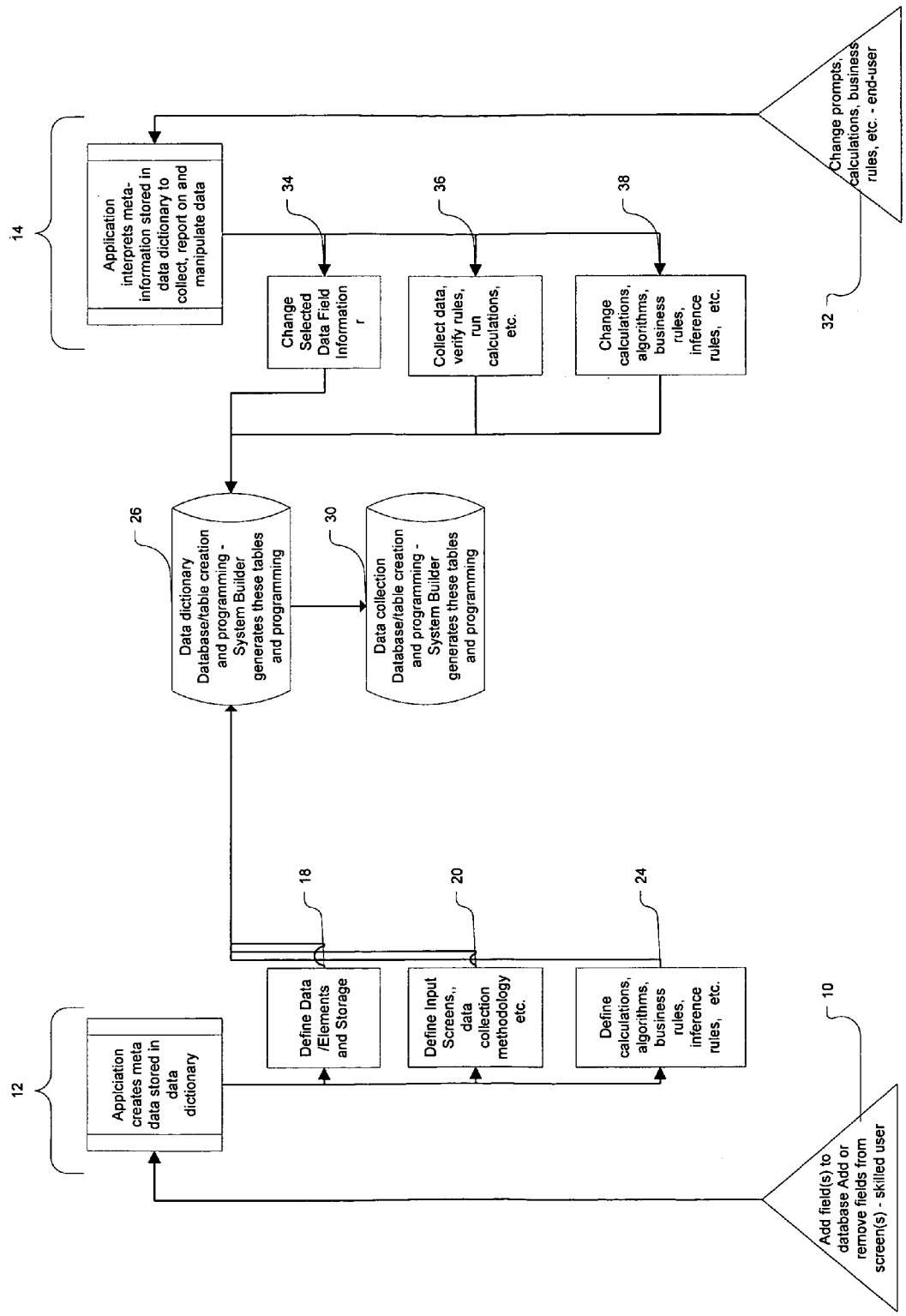
FIG. 1 is a flow chart showing the overall data collection software development system of the present invention.

The present invention is a software system which enables an end user to create custom data collection applications without the assistance of a programmer or other software professionals. The present system is capable of using a predefined software structure, pre-existing templates when desired, and other system attributes, with input instructions from an end user, to produce new data collection applications with defined data fields and data storage, defined data collection methodology, multiple level rules governing the application and defined calculations.

An example of a typical end user is a lending institution which is responsible for overseeing and maintaining various loans, including, for instance, residential and commercial loans, or for overseeing the operation/cash flow of real estate properties. Other examples of end users and specific data collection applications include medical offices, for collecting and monitoring information for medical claims; any of numerous organizations which require inventory control systems; and non-profit organizations, for maintaining and analyzing information concerning donors.

It should be emphasized that the above examples of end user institutions and the specific data collection application examples related thereto are for illustration of the present system disclosed herein, and should not be considered to be limiting relative to the scope of the invention.

As indicated above, when end users have in the past had a need for a new custom data collection application, involvement of information service professionals was always necessary. Program specifications were required, actual program code corresponding to the specifications had to be written, and data base formation and management had to be accomplished. Further, the completed program had to be thoroughly tested. This would frequently require both considerable time (typically, 6–9 months) and expense. In addition, the completed system had to be maintained by experienced technical personnel.

The present invention involves a substantially different approach to development of new data collection applications. The system, for purposes of ease of explanation, comprises two major components. The two major components are software development applications/tools which are used together (1) to define (build) a basic data collection application structure in accordance with instructions from the end user through the use of predefined screens, (2) to enable editing of that basic structure and (3) to provide an ability for the end user to input data, which is first stored and then analyzed (including the use of calculation steps) by the completed new application.

One important aspect of the data collection application development system of the present invention is that no new software code is produced for the new data collection application. Rather, the functions of the new application, which are defined by the user in response to the interface screens provided by the development system, are carried out by the development system itself. The information obtained from the user's response to the interface screens produces a custom application structure within the development system for carrying out the specified functions of the new application in accordance with the end user's input information.

The first major component of the system of the present invention, referred to as the builder (or building) component, functions to produce the basic structure for new data collection applications. Briefly, this "building" component, involving information provided by the user, includes the selection and definition of data elements for the new application, development of various screens for the new application, development of applicable rules concerning calculations and requirements for the input data matrices which define specifications and guidelines for consideration and analysis of the input data, and development of reports concerning the actual outcome (results) of the data collection application. Again, the information used by the building component of the system to produce the new data collection application is provided by the end user.

The second major component of the system of the present invention, referred to as the run-time component, interprets the information gathered and structured by the first portion, and further includes the ability of the end user to modify or edit the structure of the new application, after it has been created, as well as the ability to enter actual input data for the new application.

FIG. 1 shows the overall system of the present invention and the interaction between the system builder component 12 and the system run-time component 14. The two components may be on separate servers, with the system builder component 12 being located on a centralized server, while the system run-time component 14 is located at the facility of the end user. The two components could also be on a single server. Basically, the system building component 12 gathers information from the end user by a series of screens to produce what is known as metadata, i.e. information concerning data. This metadata in turn is collected and stored in a data dictionary database, in the form of information tables.

The system builder component 12 is responsible for producing the data dictionary database, including creating the information tables therein, from information provided by the end user. The system builder component 12 is capable of creating, adding to or removing fields from existing screen templates and creating new screens to produce the new application. The information provided by the user, generalized for field information but intended to include all user-provided information, at block 10, is used by the system builder component 12 to produce appropriate corresponding metadata, as shown in block 14, which is ultimately stored as part of a data dictionary.

There are three major structural portions in a new data collection application developed by the present invention. First, the system building component, through information provided by the end user, includes a definition of the data elements which are the basis of the new application, including the type of input data, the size and name of the data, the assigned data table, and the look-up codes for the data. In essence, this portion defines the characteristics and format of the data fields which are the focus of the new application (e.g. residential loan records in a lending institution). The data elements portion includes all of the defining information concerning the data for the new application. This is represented at block 18.

A second major portion of the new data collection application structure produced by the system builder component 12 concerns the screens available to the user for the new application. This is represented at block 20. Information provided by the user about the screens to be provided in the new application specifically includes the layout, order and other information concerning the screens themselves, as opposed to the data on the screens. The number of screens and the particular information provided on each screen can vary from application to application, depending upon the user's requirements. It is the user who defines the details of the screens for the new application.

The third major portion of the new data collection application is shown by block 24 and concerns what is referred to in this application as "business rules". "Business rules" involve specific calculations, edit functions and industry-specific requirements which affect the evaluation of the data in the new application. For instance, in evaluating particular mortgage loans, there will be rules involving the evaluation and analysis of individual mortgages. Examples of such rules, on the record-level, relative to residential home loans, might include the following: (1) if the record being evaluated is a first mortgage, then there cannot be anything indicated to be superior to the first mortgage; and (2) if the record concerns purchase of a residential property, the "sales price" portion of the record cannot be zero. Again, it is the end user who defines the particular rules which are used for the new data collection application being created.

Other portions of the application structure produced by the system builder component 12 include regulatory compliance information, what is referred to as matrix specification information, and finally, report information. These additional portions of the present system will be discussed below when all of the individual portions of the application are discussed in detail.

The system builder component 12 takes all of the information concerning the above-described individual portions or aspects, and collects them in a database, referred to as a data dictionary, shown at block 26. It should be understood that the information in data dictionary 26, which defines the structure of the new data collection application, does not contain any new programming code for the new application per se, but rather information provided by the end user organized into tables. The tables actually define the new application.

The system builder component 12 also organizes a data collection database, shown generally as block 30. The data collection database 30 is for the storage of actual input information which is collected and then processed by the new application. The input data is entered, as indicated above, by the end user.

The second component 14 of the present system concerns the execution of the new data collection application produced, i.e. built, by the system builder component 12. The system run-time component 14 includes the ability to change or edit the various portions of the structure produced by the system builder component 12, as well as interpreting, i.e. processing, the metadata information in the data dictionary 26 relative to the input data. In the present system, there are limitations on the run-time component 14 relative to the new application structure produced by the system builder component. For instance, the run-time component cannot change the basic structure of the data element and screen portions 18 and 20, although some editing functions are permitted.

Basically, as shown in FIG. 1, the system run-time component 14 interacts with the data dictionary 26, with information from the user, as indicated generally at 32, to change (edit) selected data field information (block 34), to collect input data, verify existing system rules and run certain calculations (block 36) and to change the various possible calculations performed on the input data, the algorithms and the rules (block 38).

Hence, in the particular embodiment shown, the run-time component 14 has a rather limited possible effect on the basic application structure produced by the system builder component 12, but has the execution responsibility concerning the input data provided by the end user, including manipulating and analyzing the data, as well as performing various calculations on the data. Further, it has a limited ability to affect the structure of certain aspects of the application. It is possible, however, in variations of the present system, for the system run-time component to have a somewhat different functional capability relative to the application structure, i.e. the capability of the run-time component to affect the structure produced by the system builder component can be varied, in particular it can be enhanced, if desired.

Figure 3:
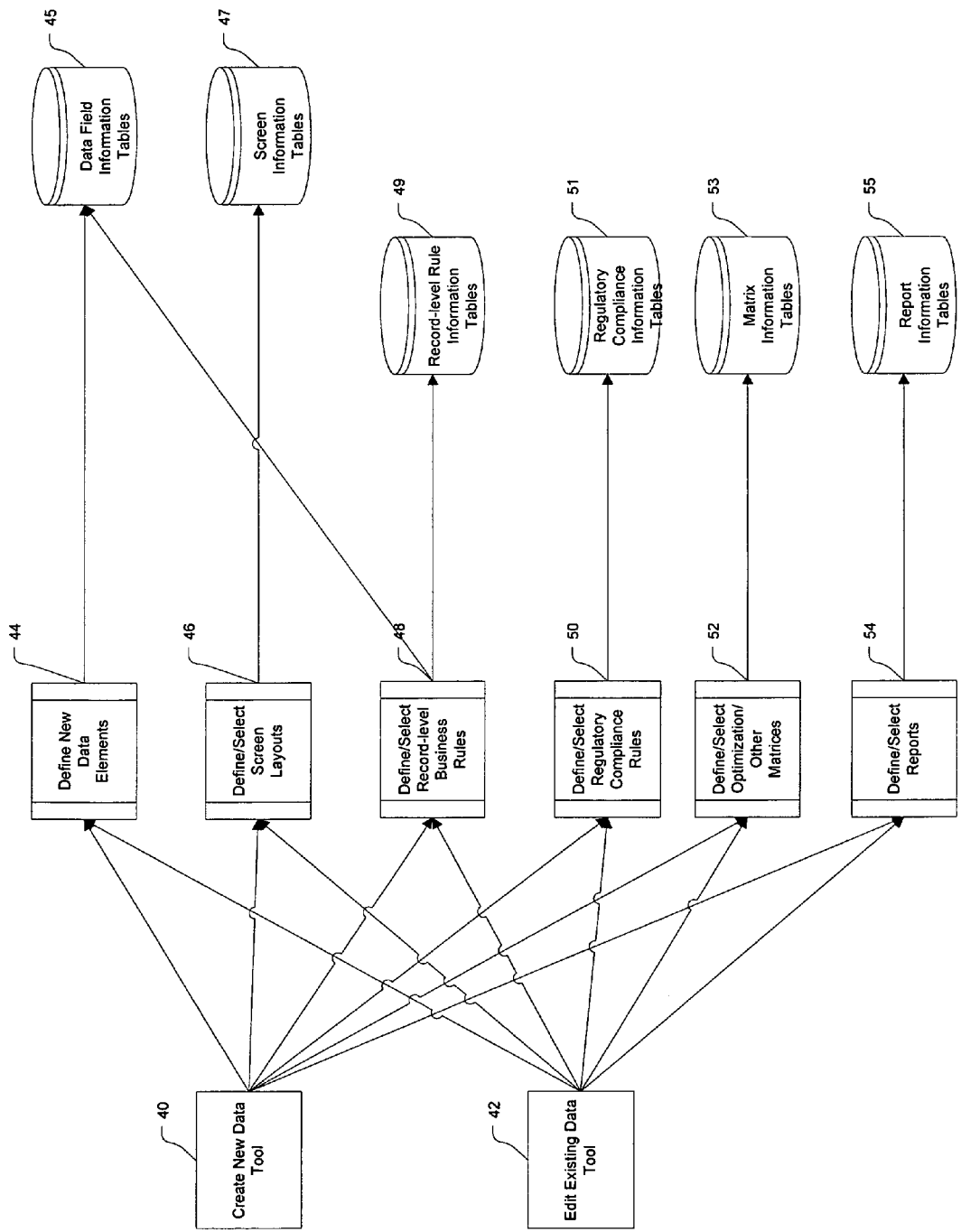
FIG. 3 is a flow chart for one portion of the system of FIG. 1.

Referring now to FIG. 3, the system builder component 12 includes the ability to create an entirely new data collection application (referred to as a data tool), as shown at block 40, or to edit an existing data collection application (data tool), as shown at block 42. In creating an entirely new application, new data elements are defined, as shown at block 44; screen layouts are either defined or selected, as shown at block 46; business rules are defined or selected as shown at block 48; regulatory compliance rules are defined or selected as shown at block 50; optimization and other matrix functions are defined or selected as shown at block 52; and reports are defined or selected as shown at block 54.

The same functions are carried out when an existing data collection application of the end user is to be changed, i.e. edited. The present system thus has the advantage to the end user of not only being able to create new data collection applications to meet new requirements, but also to edit existing applications. The information provided in response to screens for blocks 44, 46, 48, 50, 52 and 54 is then converted into corresponding information tables in the form of metadata, including data field information tables 45, screen information tables 47, record-level rule tables 49, regulatory compliance information tables 51, matrix information tables 53 and report information tables 55, which then are used to form the database dictionary 26.

Figure 4:
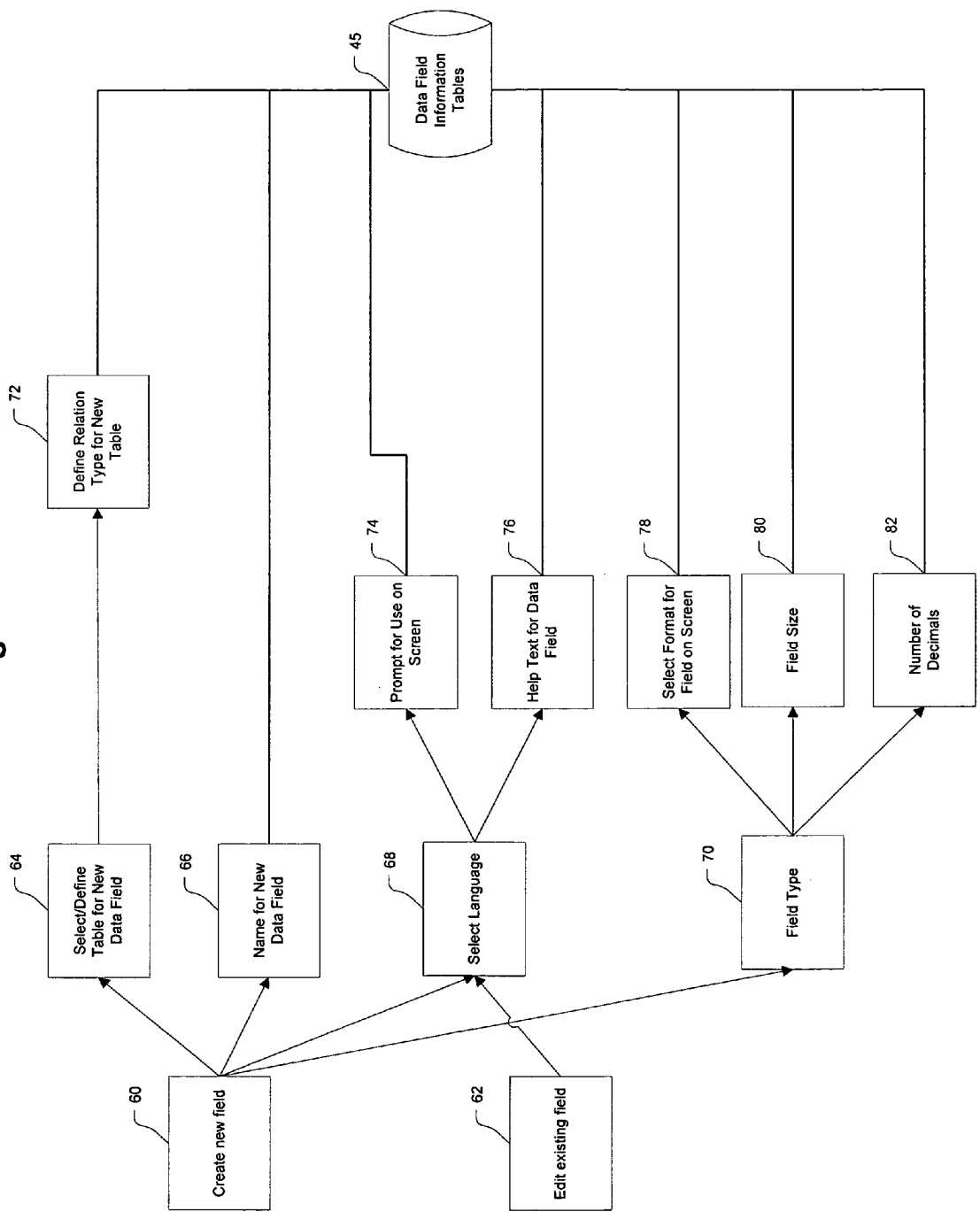
FIG. 4 is a flow chart for another portion of the system of FIG. 1.

FIG. 4 is a detailed flow chart for the system builder component 12 relative to creating/editing the data elements of the application structure, in response to specific input from the end user. In dealing with data elements, either a new data element field can be created as shown at block 60, or an existing data element field can be edited, as shown at block 62. In creating a new data field, a new table may be created, the field may be added to an existing table, a name for the new data field can be produced, the language for the data field can be selected and the data field type can be chosen, as shown at blocks 64, 66, 68 and 70.

In defining the table for the new data element field (block 64), the type of new table (if a new table is to be created) can be defined, as shown at block 72. It should be noted that the functions of block 68 and 70 can only be accomplished by the user with respect to new data fields; such functions for existing data fields cannot be changed by the user. Following the selection of the field language (block 68), e.g. English, French, German, etc., a selection of a particular prompt for use on the screen and the "help" text for the data field is made by the user, as shown at blocks 74 and 76. Separate prompt and help texts can be used for each language.

For the field type block 70, the format for the field on the screen can be selected (block 78), as well as the field size (block 80) and the number of decimals if the data element is in numeric form (block 82). Of the various instructions provided in FIG. 4, data elements which may be "imported", i.e. obtained "as is" from an existing application, can be edited except for the data element name and the table to which it belongs.

All of the information described in FIG. 4 in the various blocks is provided by the user and then established in data field information tables (block 45) and then placed into data dictionary database 26.

Figure 5:
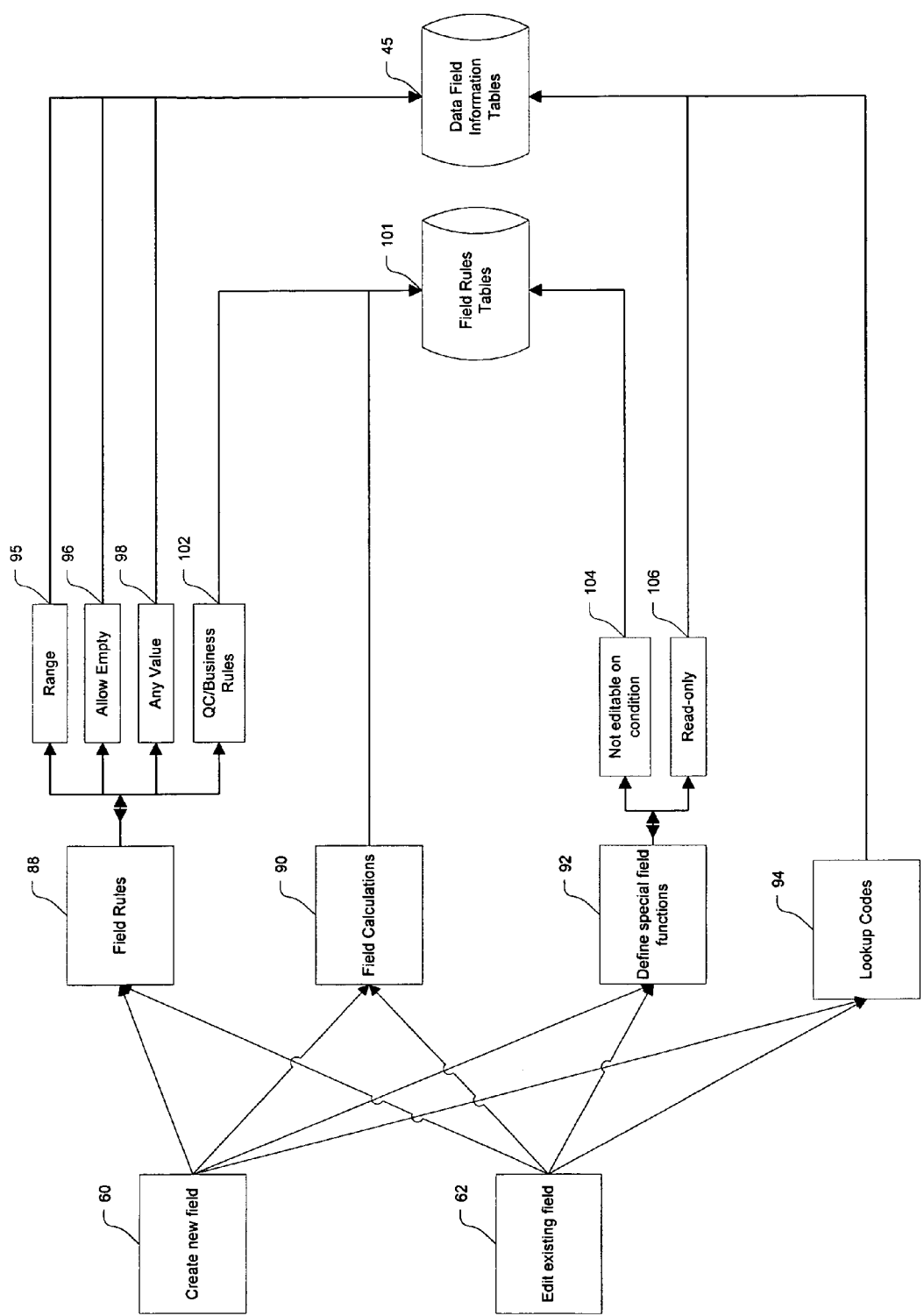
FIG. 5 is a flow chart for another portion of the system of FIG. 1.
Figure 6:
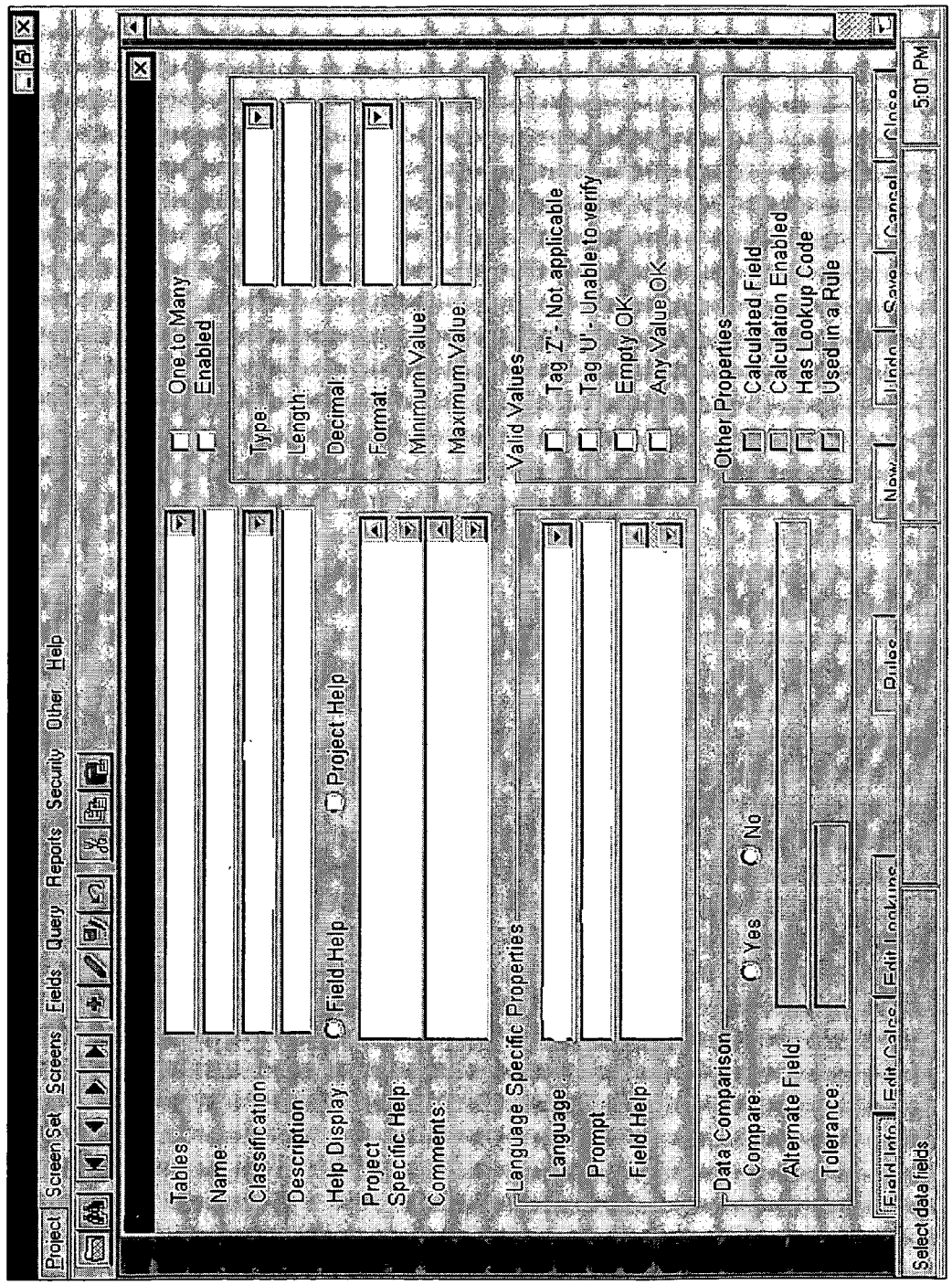
FIGS. 6, 7, 8 and 9 are interface screens to permit the user to define the system portions of FIGS. 4 and 5.
Figure 7:
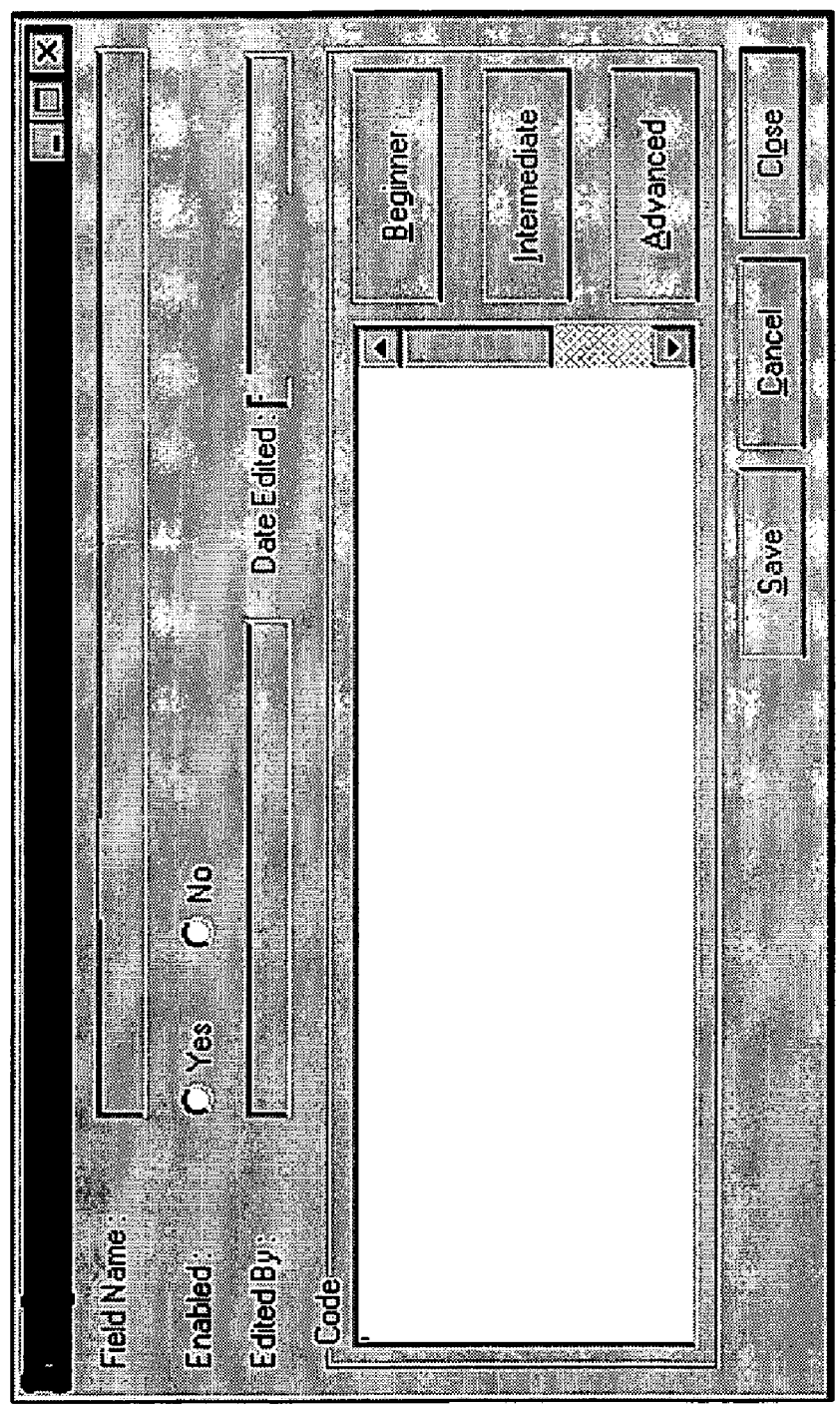
Figure 8:
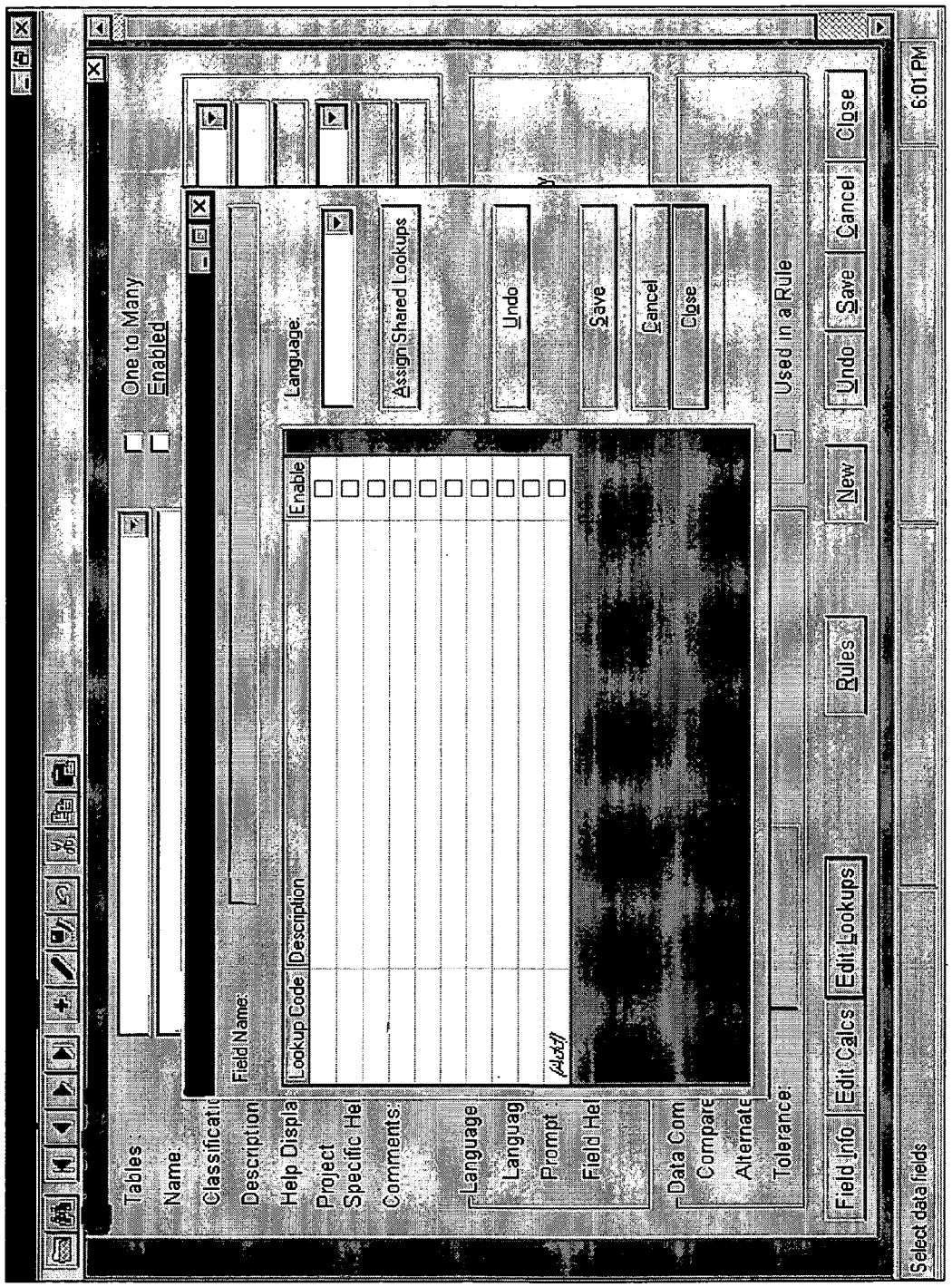
Figure 9:
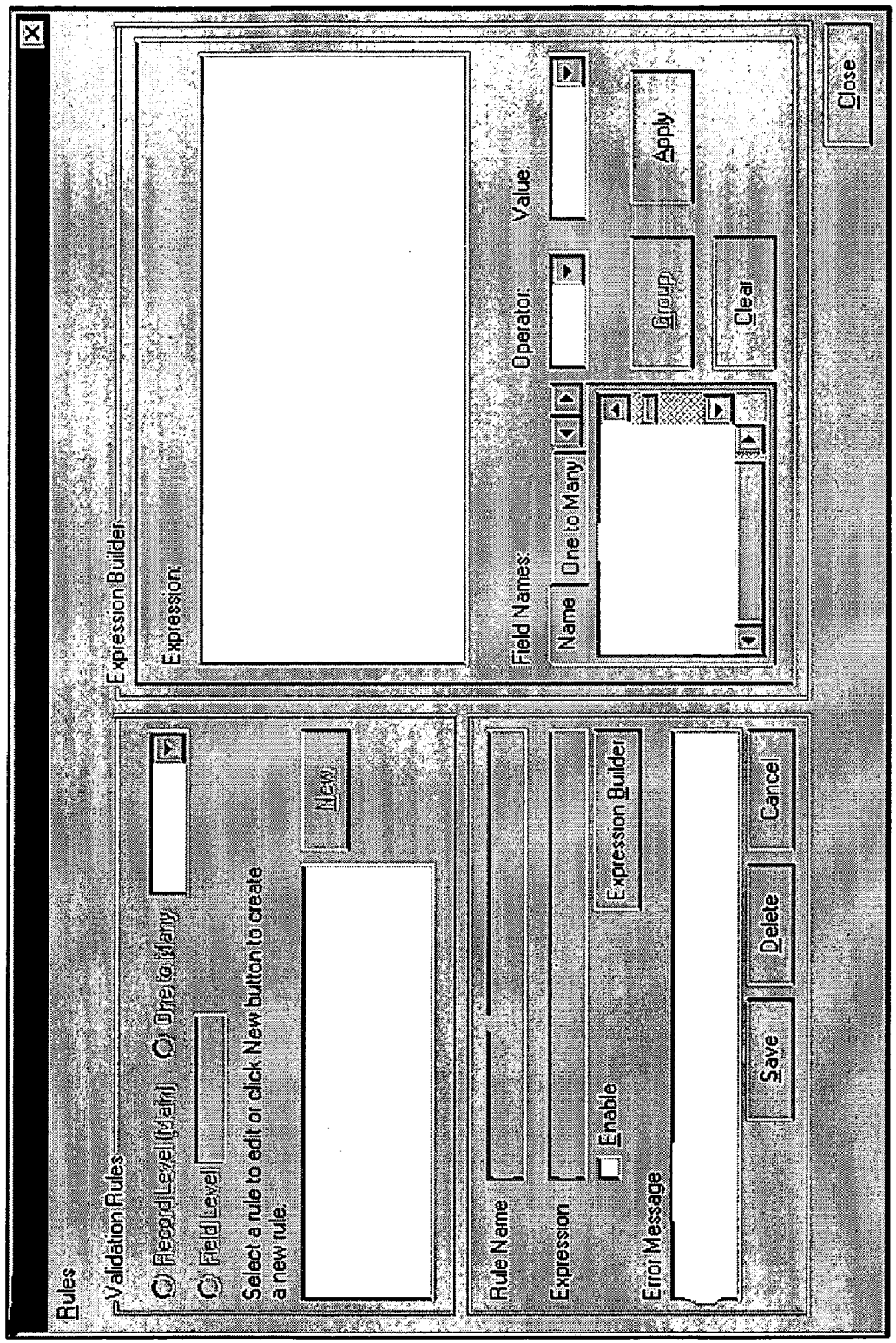

FIG. 5 shows additional flow chart information for the data elements, i.e. it is an addition to FIG. 4. Referring to FIG. 5, information concerning the field rules (block 88), the particular calculation to be stored in the fields (block 90), special field functions (block 92) and look-up codes (block 94) can be defined by the user, both for creating new data elements and editing existing ones. Under the field rules, the range of the field (95), whether or not the field can be allowed to be empty (96), whether or not there are any limitations on the field value (97) and business rules affecting the field (102) can all be provided by the user. All of this information is produced in the form of data field information tables in the data dictionary 26. Information concerning field calculations, meaning the numerical calculations which are accomplished on the data elements, can be provided as set forth in block 90. This information appears in field rules tables 101 of the system structure.

Special field functions (block 92) include information indicating that the field itself is not changeable under certain specified conditions (block 104), and information indicating a read-only function for the field (block 106). The information from block 104 is applied to rules tables 101, while read-only information is applied to data field information tables 45. Look-up code information is included as part of the data field information tables for both new fields and for existing fields.

FIGS. 6, 7, 8 and 9 are interface screens for the end user to provide instructions for the system builder component 12 relative to the creation or editing of data elements shown in FIGS. 4 and 5 for the new or existing application of the user. These interfaces are believed to be self-explanatory, and therefore are not described in detail.

Figure 10:
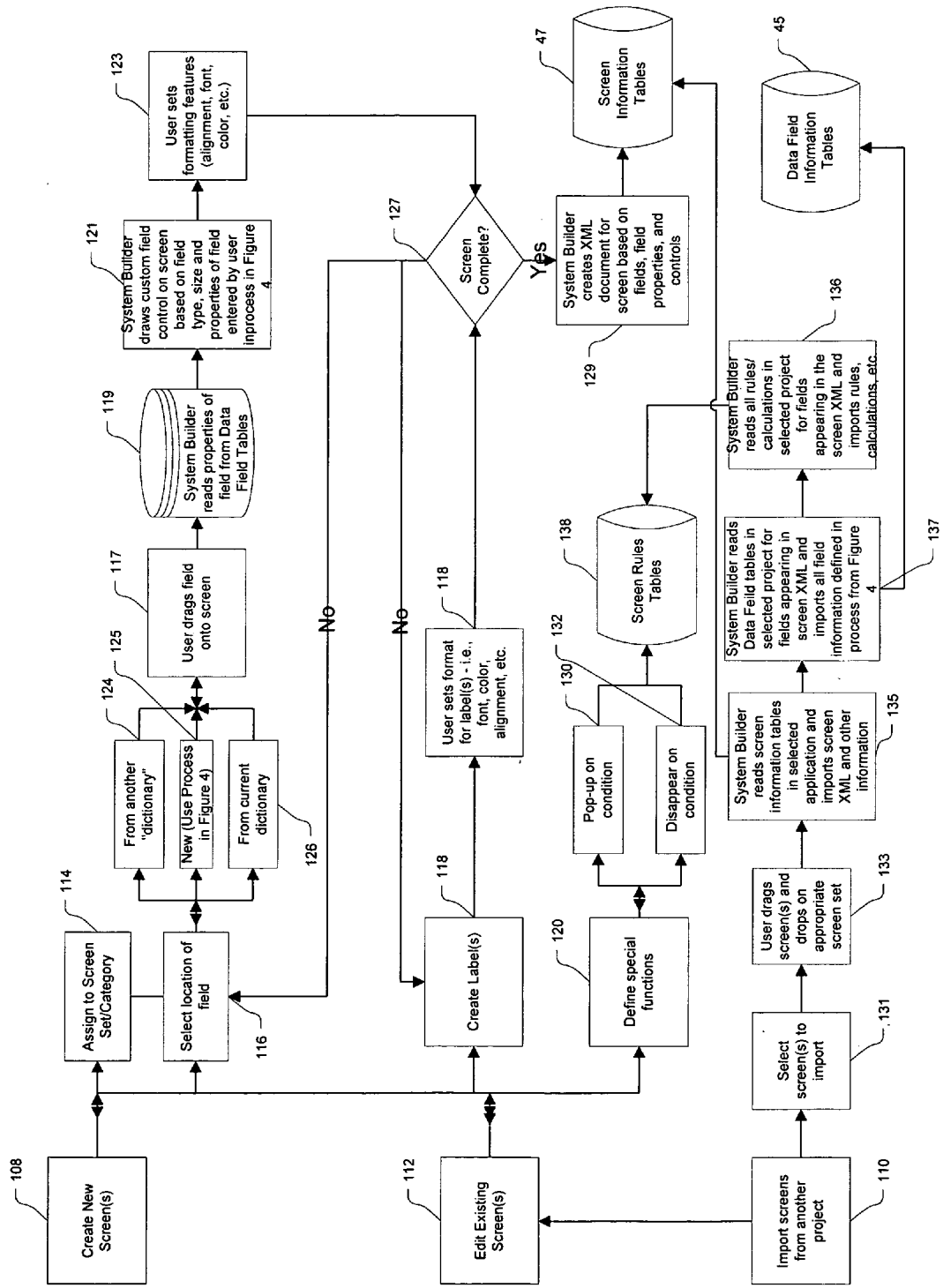
FIG. 10 is a flow chart of another portion of the system of FIG. 1.

FIG. 10 is a flow chart in which the system builder component 12 of the present system is used to define the structure for the data collection screens. The definition of the data collection screens is again accomplished in accordance with instructions from the end user. The system builder component 12 has the capability of creating new screens (block 108) or importing screens from another application (block 110) for a new data collection application. System builder component 12 also has the capability of editing screens in an existing data collection application, shown at block 112.

With respect to blocks 108 and 112, several information capabilities are provided, including the assignment of the screen to a particular set/category (block 114), the selection of the location of the fields in the particular screen (116), the creation of labels for the screens (118) and the definition of special functions of the screens.

The information concerning the screen set/category provided by the user is incorporated in the screen information tables, as well as the XML (extensible mark-up language) document (block 129) through block 116. Relative to block 116, information concerning the selection of the location of the screen fields can be obtained from another data dictionary in another, existing application (block 124); or it could be an entirely new selection of fields (block 125), developed in accordance with the process shown in FIG. 4, or it could be from the current data dictionary, i.e. from block 126.

The user then "drags" the selected or created field onto the screen, as shown in block 117. The system builder component 12 then reads the properties of the field from the data field tables, as shown in block 119, and then actually produces the custom field on the screen, based upon the information previously provided by the user, as shown at block 121. The user then goes further, establishing the actual format of the fields on the screen, including the alignment, the particular font, color, etc., as shown in block 123. The user will then see a "screen complete" prompt, which requires a decision (block 127). If the answer is no, the program reverts, i.e. loops back, to block 116 for the next field. This process continues until all the fields in the screen are complete, at which point the system creates an XML document for the particular screen, based on the created fields, including the field properties and the controls. This is represented in block 129. The XML document information will then be provided for the screen information tables, represented at block 47.

The user has the opportunity to set the format for the labels for each screen (block 118), including the particular font, color, alignment, etc. From there, the screen complete prompt (block 127) is shown to the user. If all the labels in the screen are not complete, the program reverts back to block 118 until all labels are completed.

Figure 11:
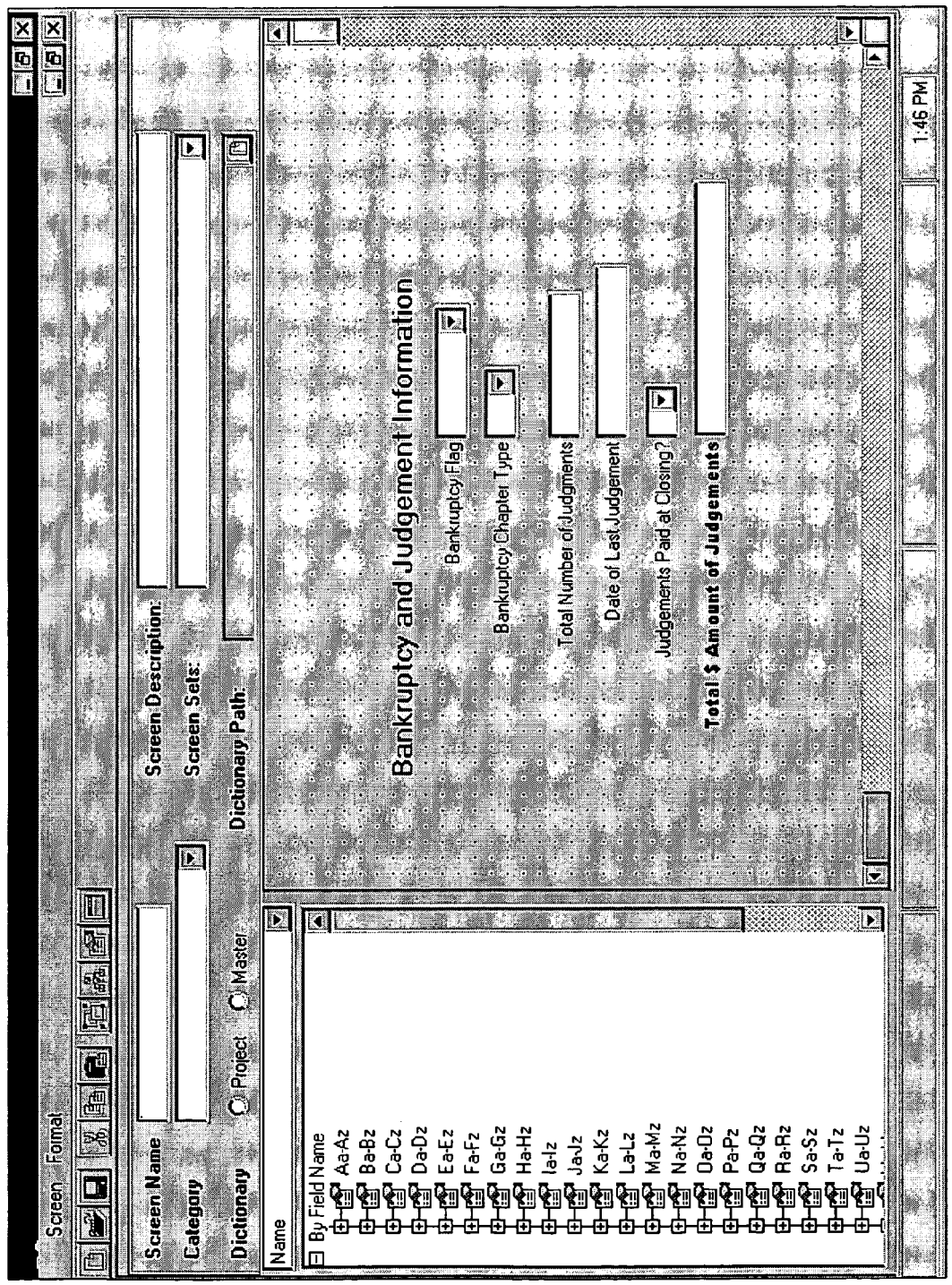
FIGS. 11 and 12 are interface screens to permit the user to define the system portion of FIG. 10.

For the special function instructions for the screens, the end user can provide either (1) special pop-up instructions following the occurrence of a particular condition, or (2) provide that the screen disappear under particular conditions. This information is represented by blocks 130 and 132, respectively. The information from these blocks is supplied to the rules tables for the screen. The interface for defining a new screen or editing an existing screen is shown in FIG. 11.

Referring still to FIG. 10, importing an entire screen from another data dictionary is an important capability of the system builder component of the present invention, as it enables a user to very quickly provide a significant data collection capability/function without substantial time and effort. When a screen is imported from another dictionary, the system builder component 12 will import not only the screen itself, but will also include all the fields and their attendant calculations, rules and look-up codes.

This is shown clearly in FIG. 10. First, at block 131, the selection of particular screens to import from another application is made. The user, after the selection, drags the selected screens and "drops" the screen on the appropriate screen set, as shown at block 133. The system builder component 12 then reads the screen information tables in the other selected application and imports the screen XML and other information from that application. That information is then applied to the screen information tables 45. The reading of the screen and the importing of the information is represented at block 135. The system builder component also reads the data field tables in the selected application for particular fields which appear in the screen XML and imports all the field information defined in the process shown in FIG. 4.

Figure 12:
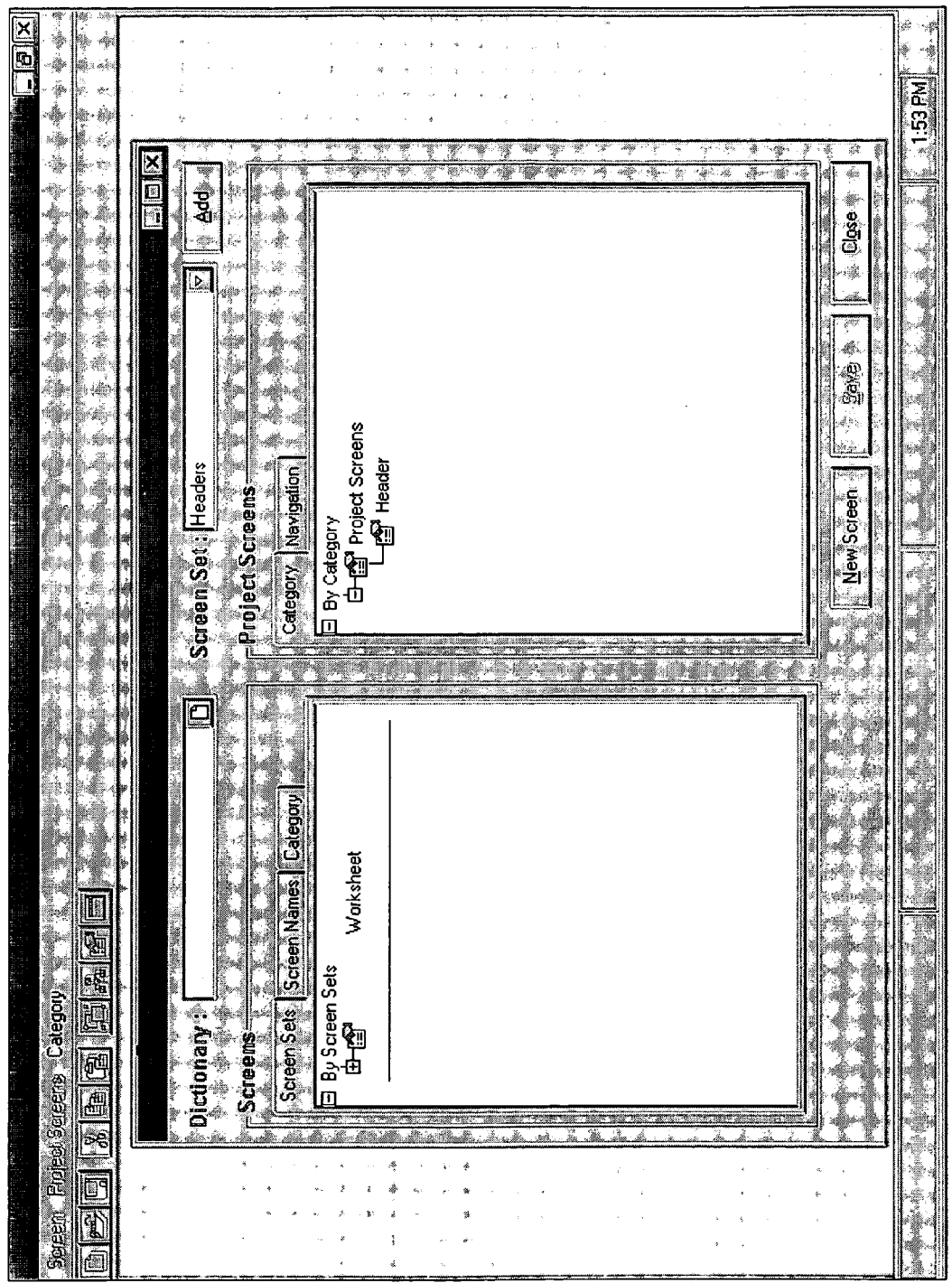

The system builder component will also then read all the rules/calculations in the selected application for those fields which appear in the screen XML, and imports those rules and calculations into the new application information structure. This is shown at 139. The information is then entered in rules tables. FIG. 12 shows the interface screen for importing an existing screen into the new application.

In a conventional processing system, field information cannot be imported from another application. However, in the present system, as described above, existing screens may be imported from other applications and put into the metadata data base for the new application, without the need for special programming assistance, i.e. the end user is capable of providing sufficient instructions in order to accomplish the desired result.

Figure 13:
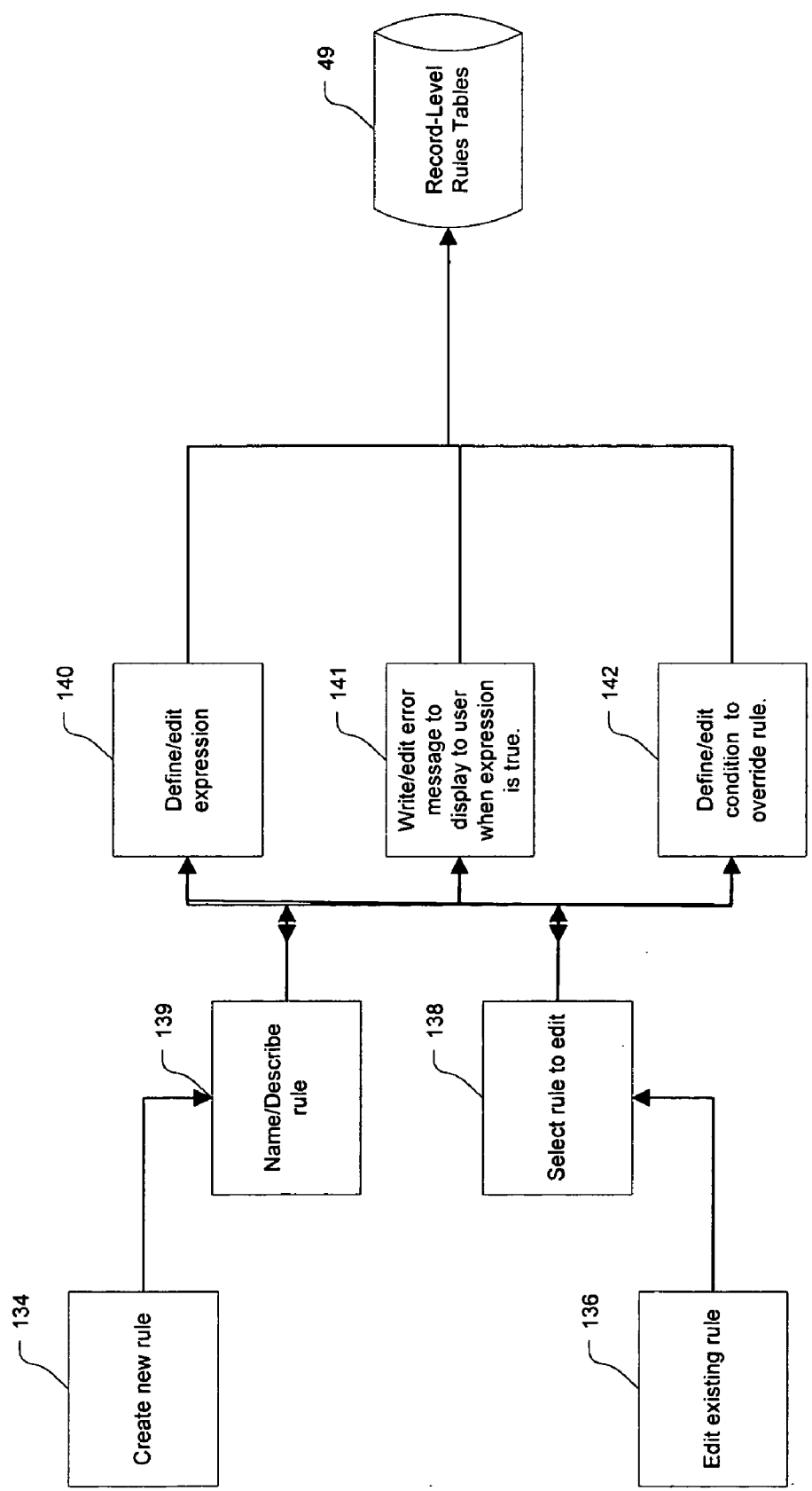
FIG. 13 is a flow chart for another portion of the system of FIG. 1.

FIG. 13 shows the flow chart for creating record-level business rules for the new application. Other business rules, in the form of calculation rules and field level rules and the interfaces associated therewith are accounted for elsewhere. FIG. 13 concerns rules which involve multiple fields; hence, the term record-level rules, since a data record will have several fields.

Examples of record-level rules for a residential loan, for instance, concern such issues as modification of existing loans or the relationship of the date of the loan to the first payment. These affect several fields within the record. The end user through the system builder component 12 can add to, change or delete the various record-level rules.

In FIG. 13, blocks 134 and 136 refer, respectively, to the creation of a new record-level rule and the editing of an existing rule in a current application, again by the end user supplying information. From block 134, the rule can be both named and described (block 139). From there, the actual expression of the rule can be defined, in block 140; the error message which is displayed when the conditions of the rule are met (violated) is shown in block 141, and the ability to define the conditions under which the rule may be overridden is shown by block 142. The information provided by the user through blocks 140, 141 and 142 is incorporated as record-level rules in block 49. In the standard software development system, these record-level rules would be written into code, defined and/or changed by the software developer. In the present invention, this is accomplished by end user instructions.

Figure 14:
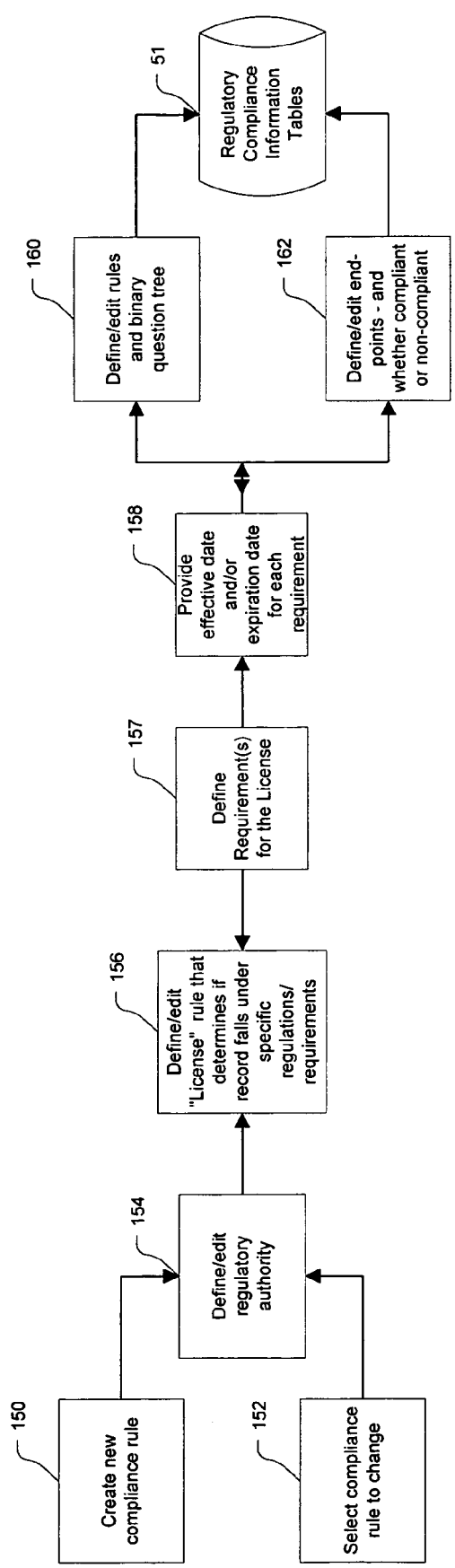
FIG. 14 is a flow chart for another portion of the system of FIG. 1.

In many industries, there are issues concerning compliance with government regulations. The system builder component 12 has the ability to provide compliance evaluation and review relative to such regulations, with instructions/guidance from the end user. This is shown in FIG. 14. FIG. 14 allows the end user to provide information which defines both legal (statutory) and regulatory (rules) requirements of federal and state agencies. FIG. 14 refers to both as simply rules or requirements. The requirements can be grouped to represent licensing regulations or can represent specific statutes, such as truth-in-lending laws. The new application, by applying the information/question "tree" of FIG. 14 provided by the end user, can evaluate whether the information in the data record (the input data) complies with applicable statutes and/or regulations.

In FIG. 14, the user can enter a new compliance rule (block 150), if a new statute or regulation is applicable, or modify (change) an existing compliance rule, if an applicable statute or regulation happens to change (block 152). Both of these possibilities use the same follow-on tree of questions/information established by the end user to determine compliance. First, the appropriate regulatory authority is identified by the user, in block 154. Next, in block 156, the precise license or regulation is defined/edited which determines whether or not a particular data record falls under the specific regulation or requirement.

In block 157, the actual step-by-step requirements to satisfy the particular regulation or statute are established, while in block 158, the effective date and/or the expiration date for each regulation/requirement is established. From there, the rules for each regulation and the particular questions necessary to establish compliance are entered (block 160), while in block 162, the determination criteria concerning whether or not the particular record is compliant or non-compliant with the regulation are provided. The compliance information is included in the compliance information tables 51 of the dictionary data base.

Figure 15:
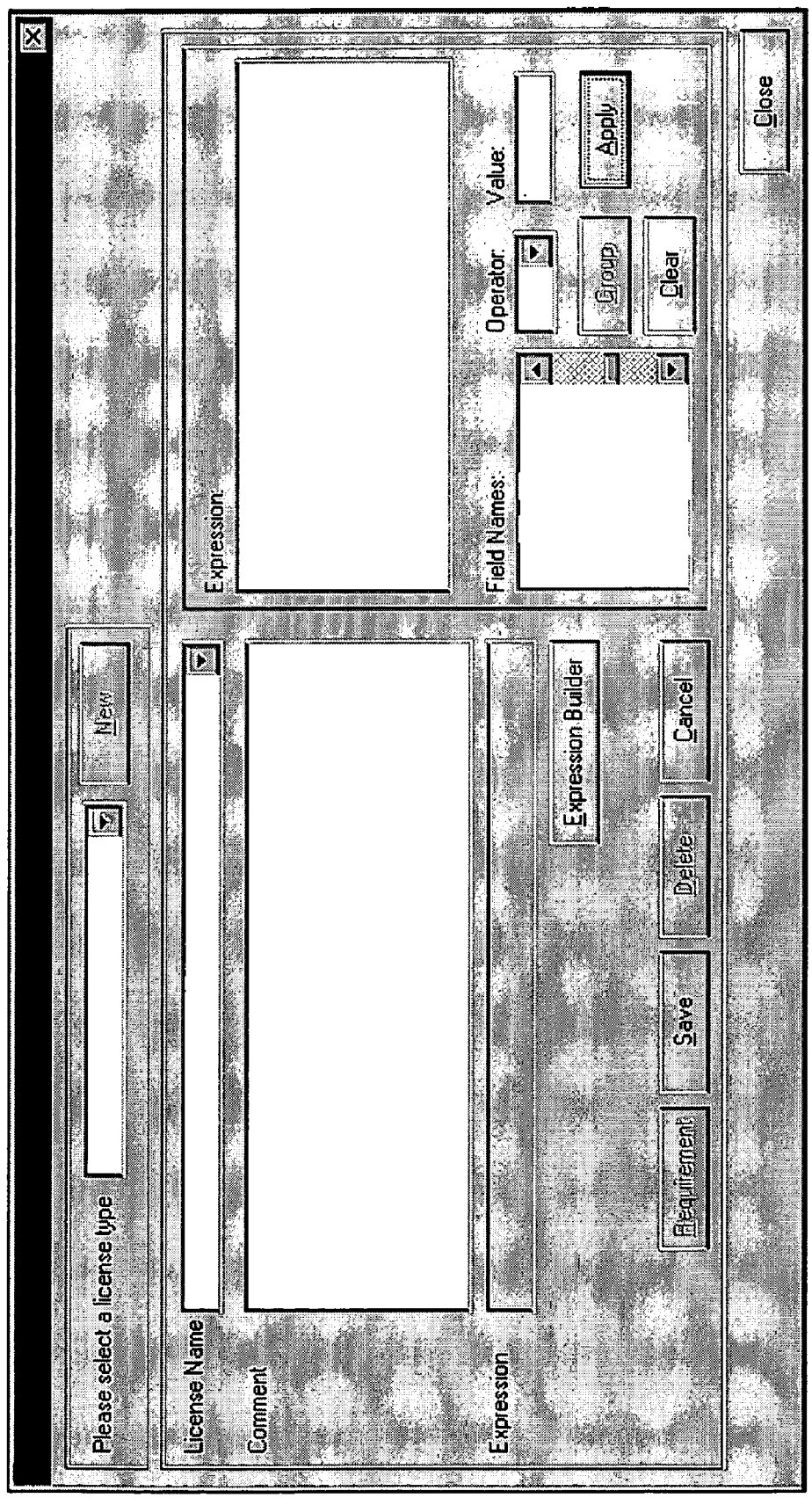
Figure 16:
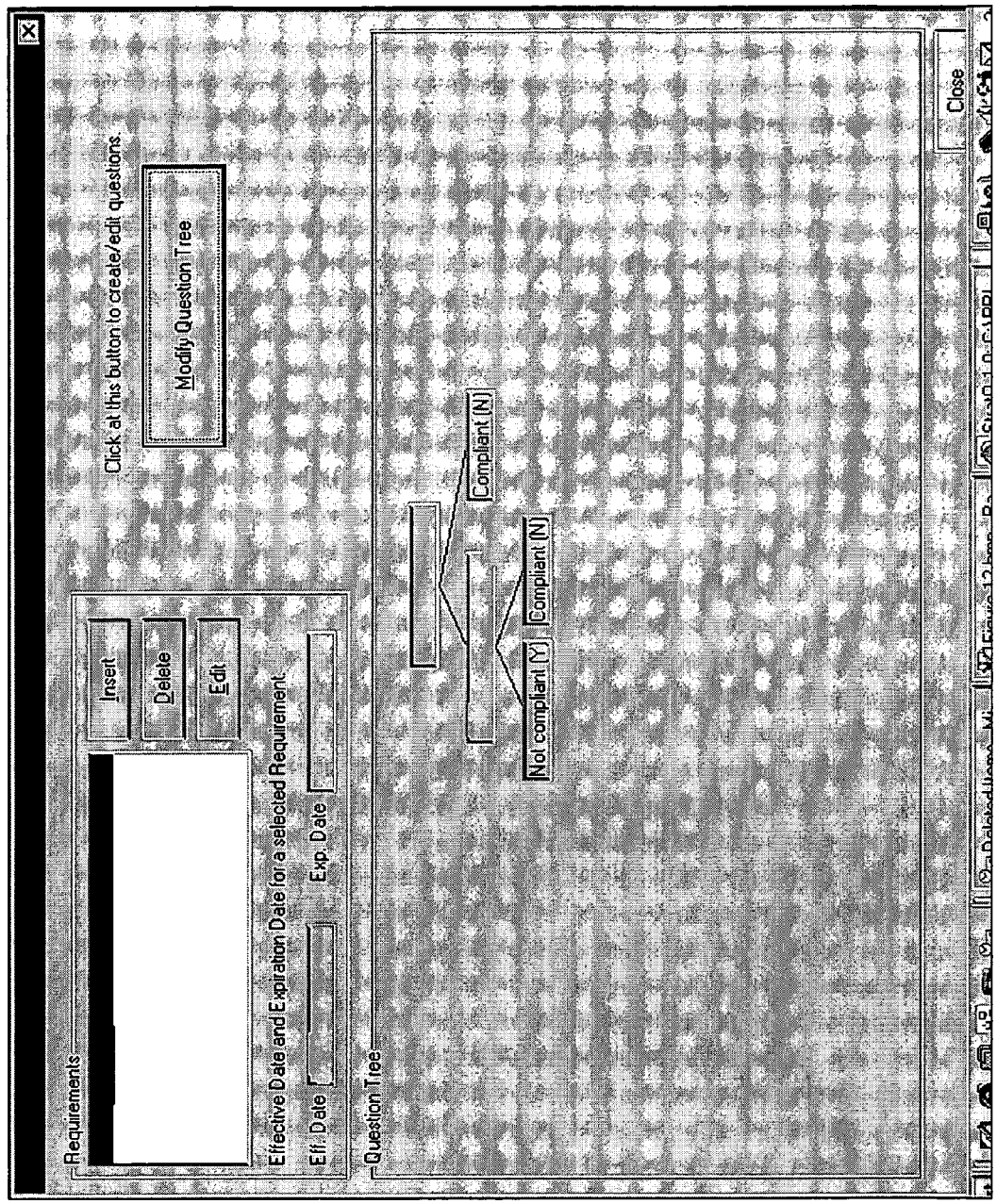
Figure 17:
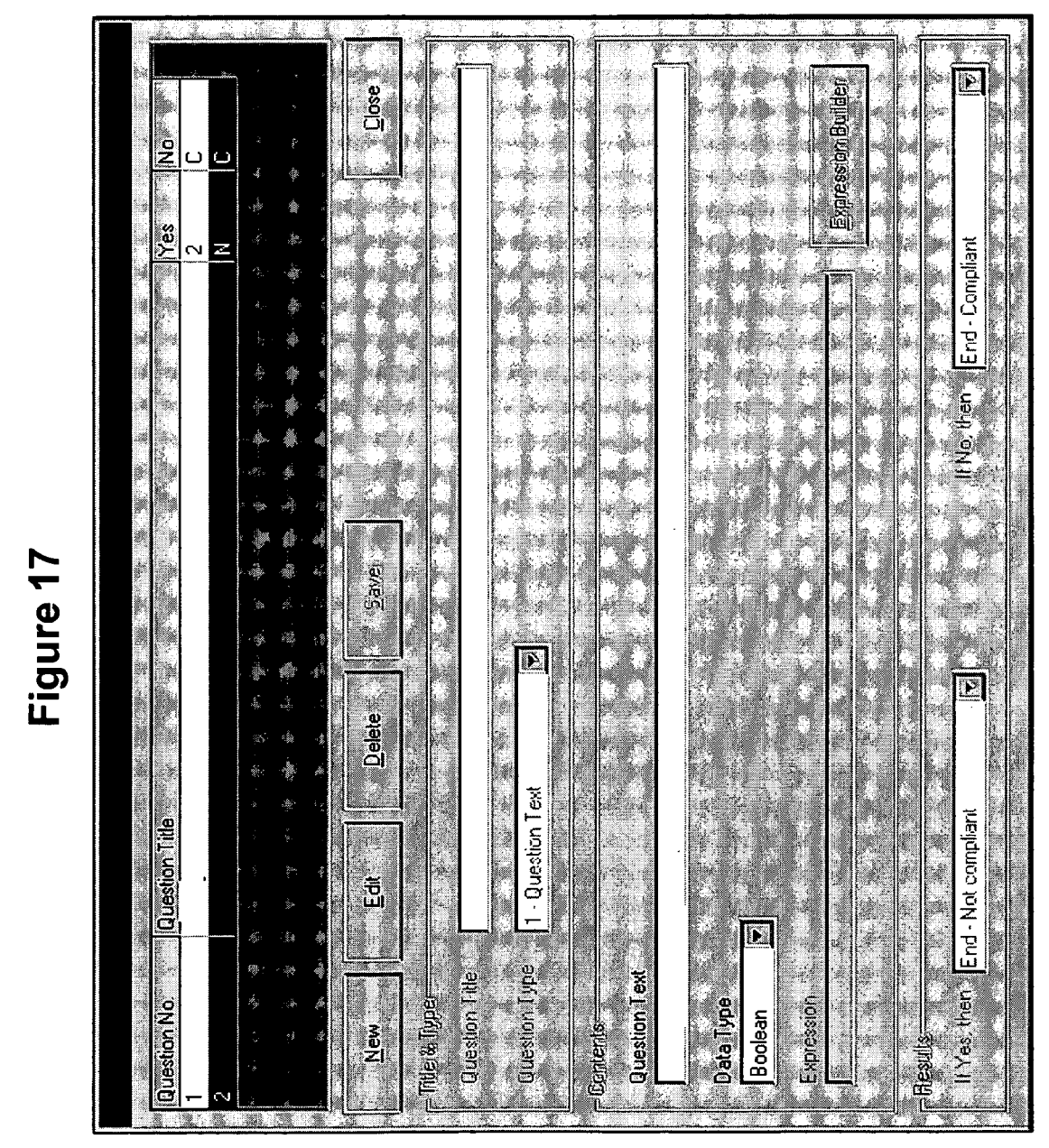

FIGS. 15, 16 and 17 show interface screens by means of which necessary information concerning compliance with applicable regulations and/or statutory requirements for the particular data collection application can be obtained from the end user.

Figure 18:
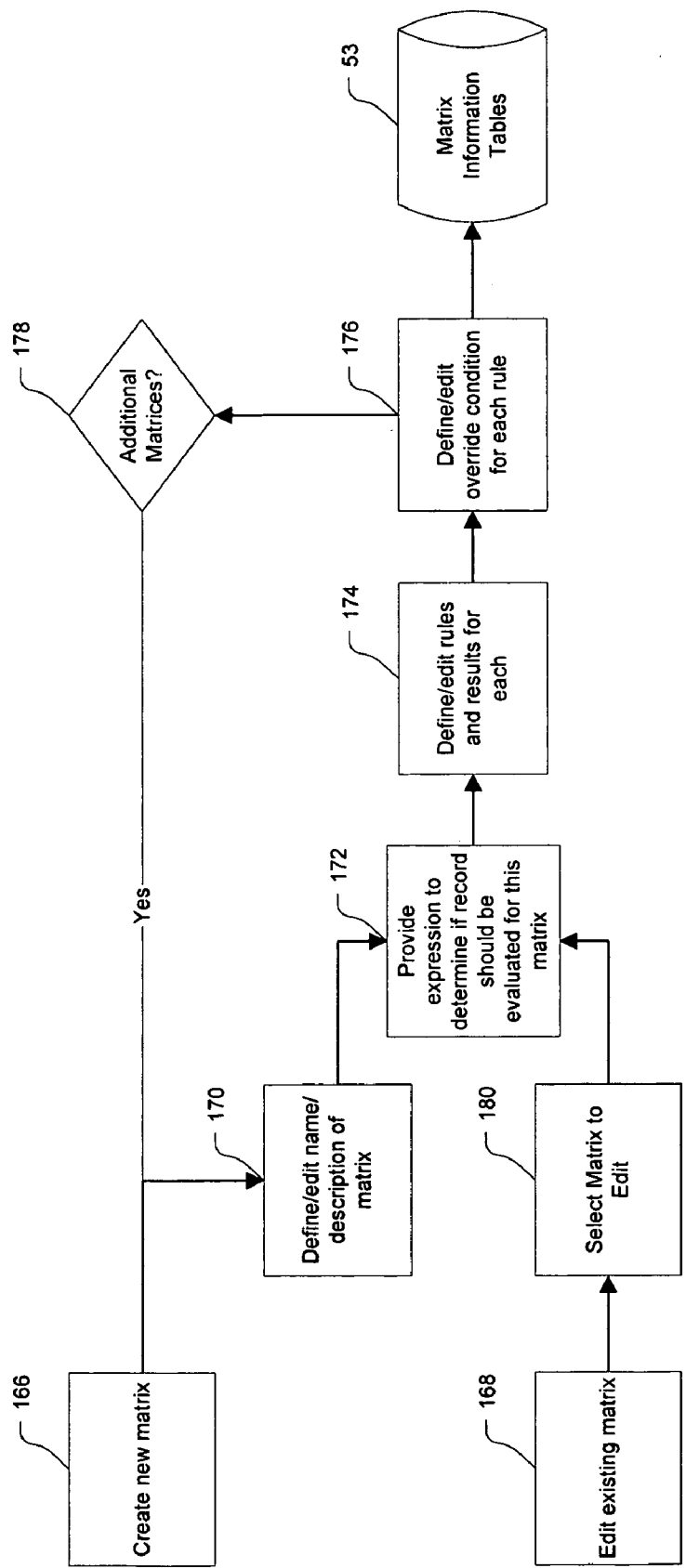
FIG. 18 is a flow chart for another portion of the system of FIG. 1.

FIG. 18 shows the flow chart for building a matrix (set) of specifications for the data records of the new application. An example of such a matrix of specifications would be a series of lending guidelines for a data collection application involving mortgage financing. In a manufacturing data collection application, the matrix could be a grading specification for parts.

Referring to FIG. 18, a new matrix of specifications can be created (block 166), or a matrix from an existing application can be edited (block 168). From block 166, information concerning the name and description of the new matrix of specifications is provided by the user, as set forth at block 170. A decision point is provided at block 172 as to whether a particular record is to be evaluated against this particular matrix. From that point, the rules and the results of the matrix are defined by the end user or edited (block 174). At block 176, the conditions for overriding the matrix specification are provided.

The information for this particular matrix of specifications is provided to matrix information tables of the metadata dictionary, as indicated at block 53. Also, from block 176, the program loops back to a decision block at 178 to ascertain from the user whether there are additional matrices to be identified and composed. If there are, then the steps of blocks 170, 172, 174, 176 and 53 are repeated for that additional matrix. This continues until the user indicates that there are no additional matrices to be defined.

Figure 19:
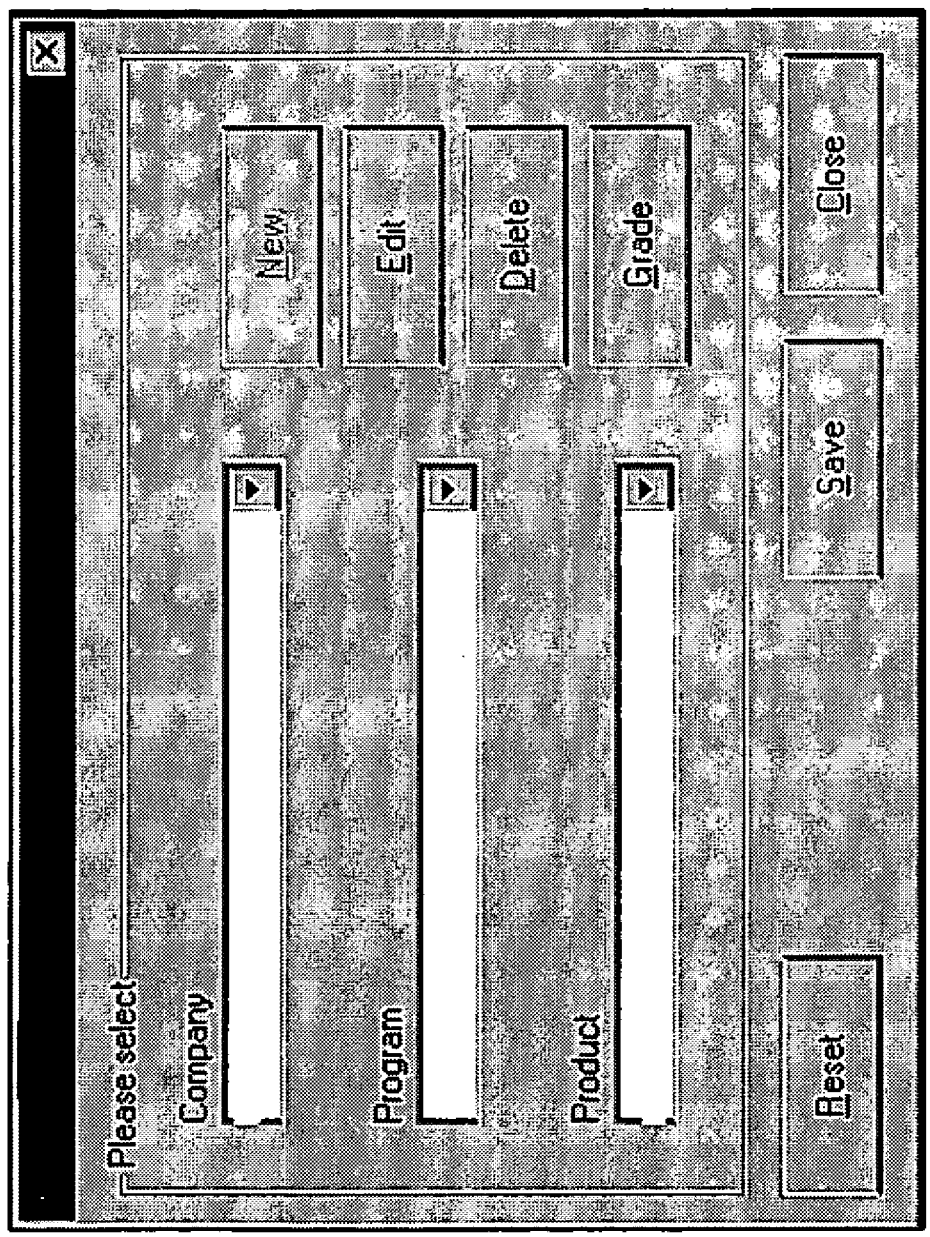
FIGS. 19–21 are interface screens to permit the user to define the flow chart of FIG. 18.
Figure 20:
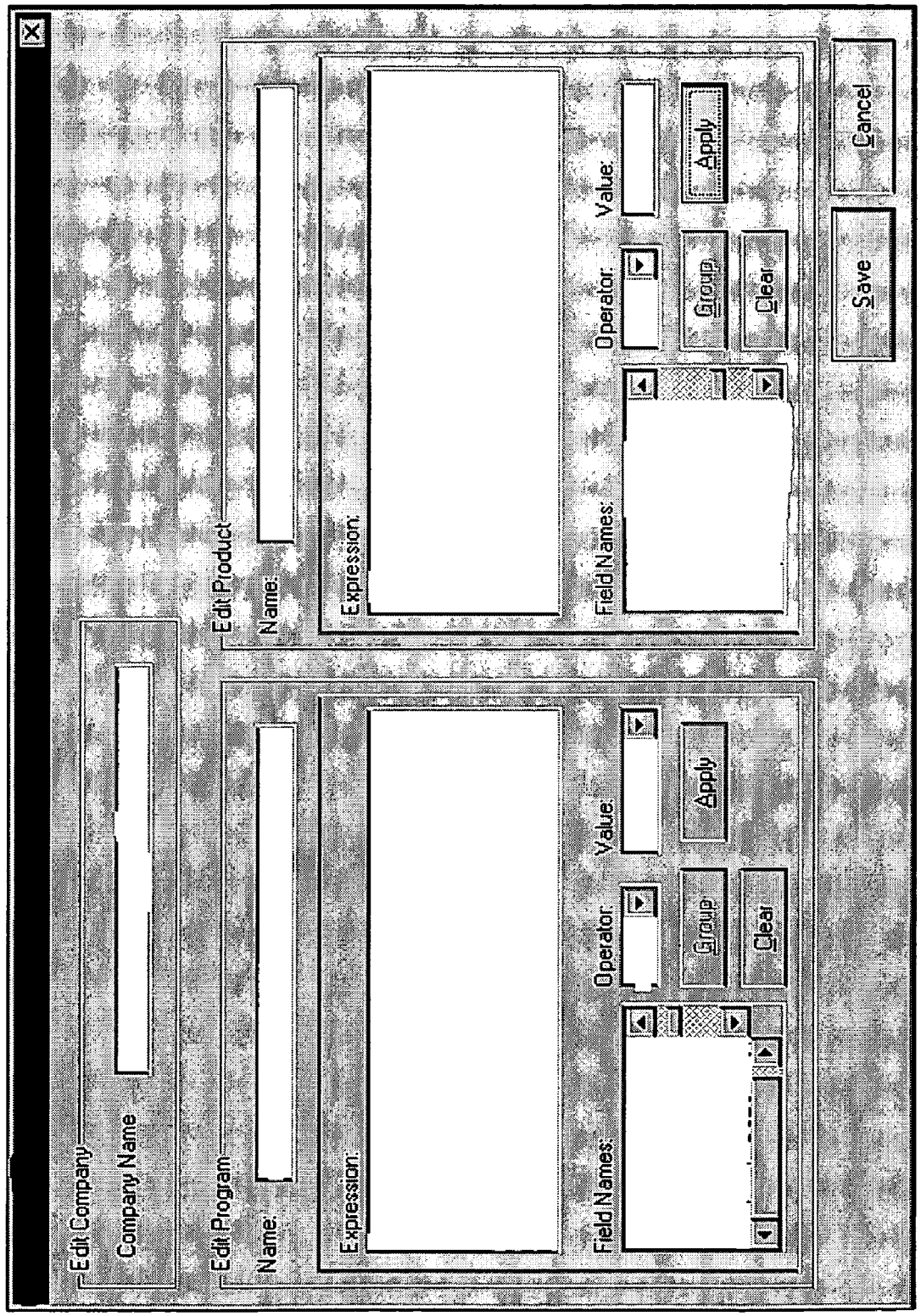
Figure 21:
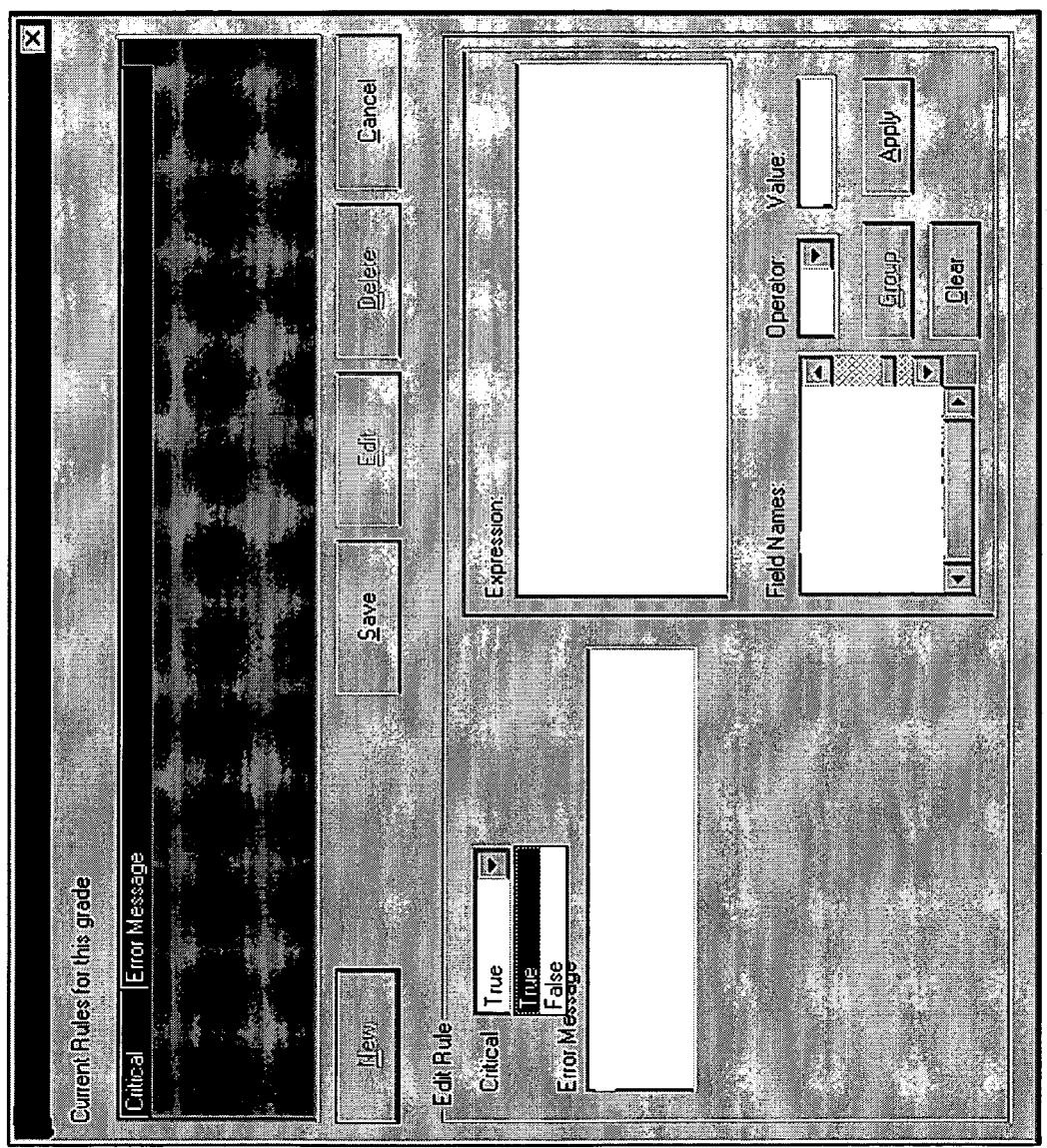

The information requested following the edit selection at block 168 includes first the selection of the particular matrix in an existing application to be edited, as shown by block 180. From there, the information steps shown in blocks 172, 174, 176 and 53 are the same as for the creation of a new matrix. In a standard system, the software developer would change and define the matrix functionality for new and edited matrixes. The interface screens for defining the matrix in the embodiment shown are shown in FIGS. 19, 20 and 21.

Figure 22:
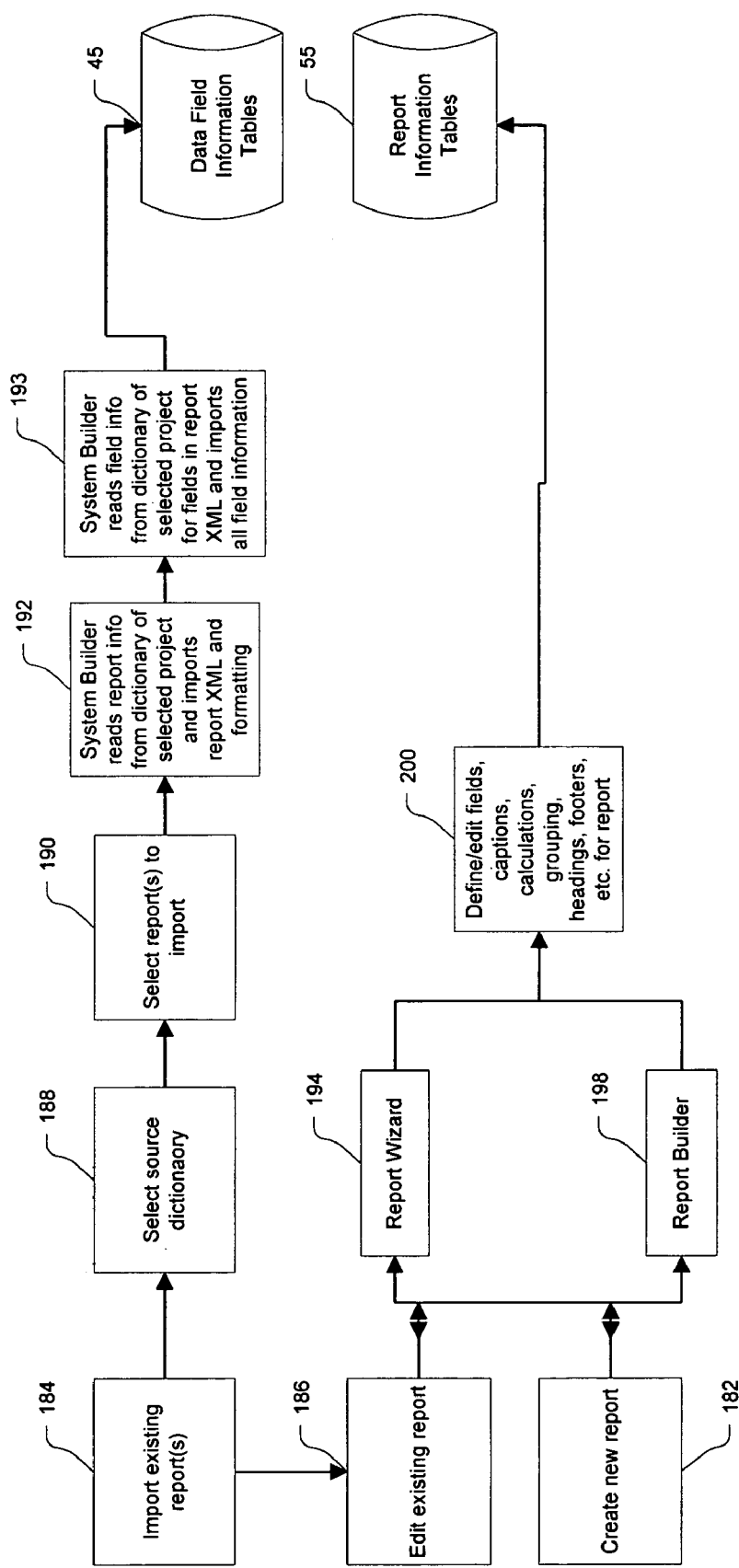
FIG. 22 is a flow chart for another portion of the system of FIG. 1.
Figure 23:
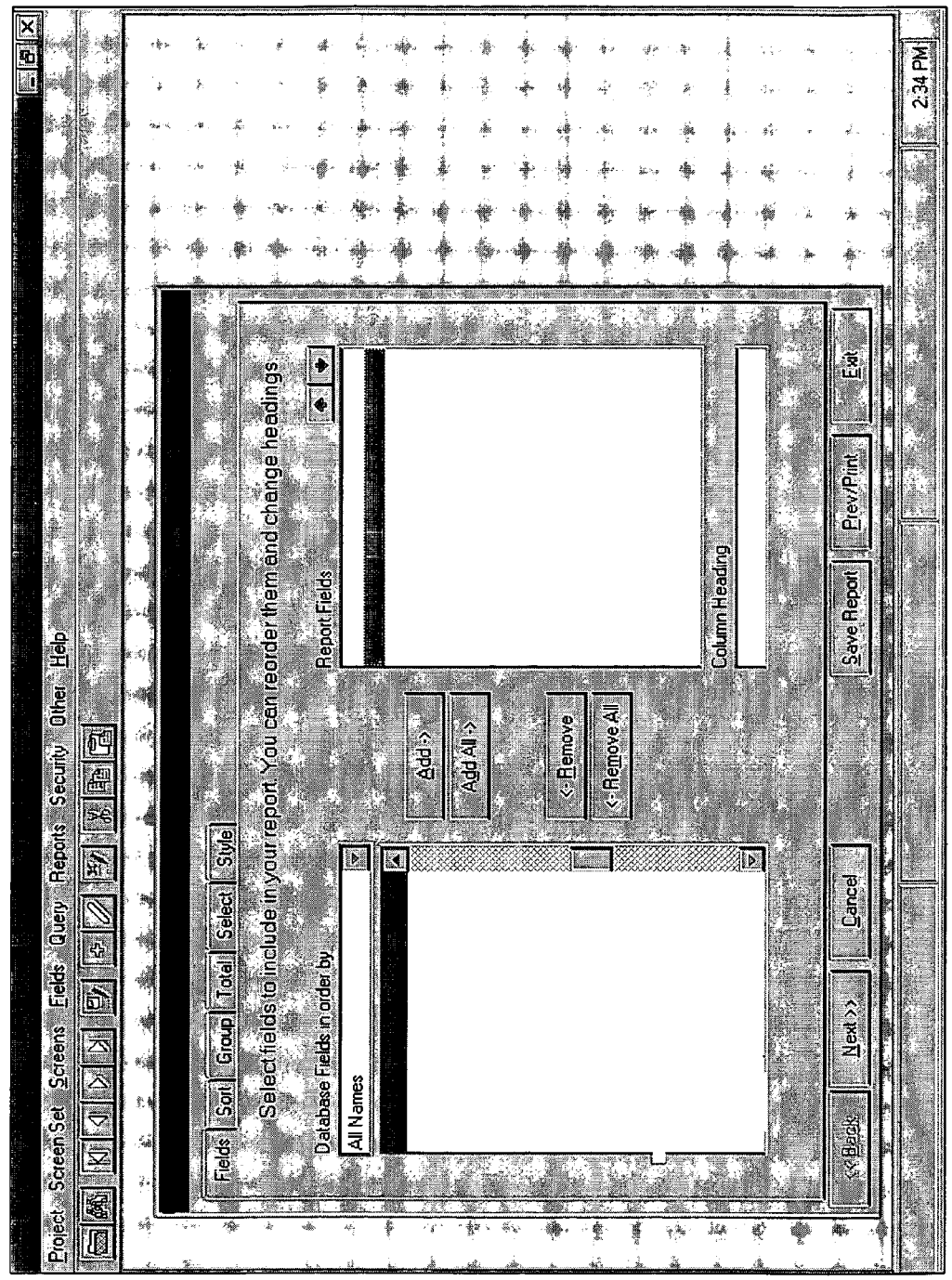
FIGS. 23–29 are interface screens to permit the user to define the flow chart of FIG. 22.
Figure 24:
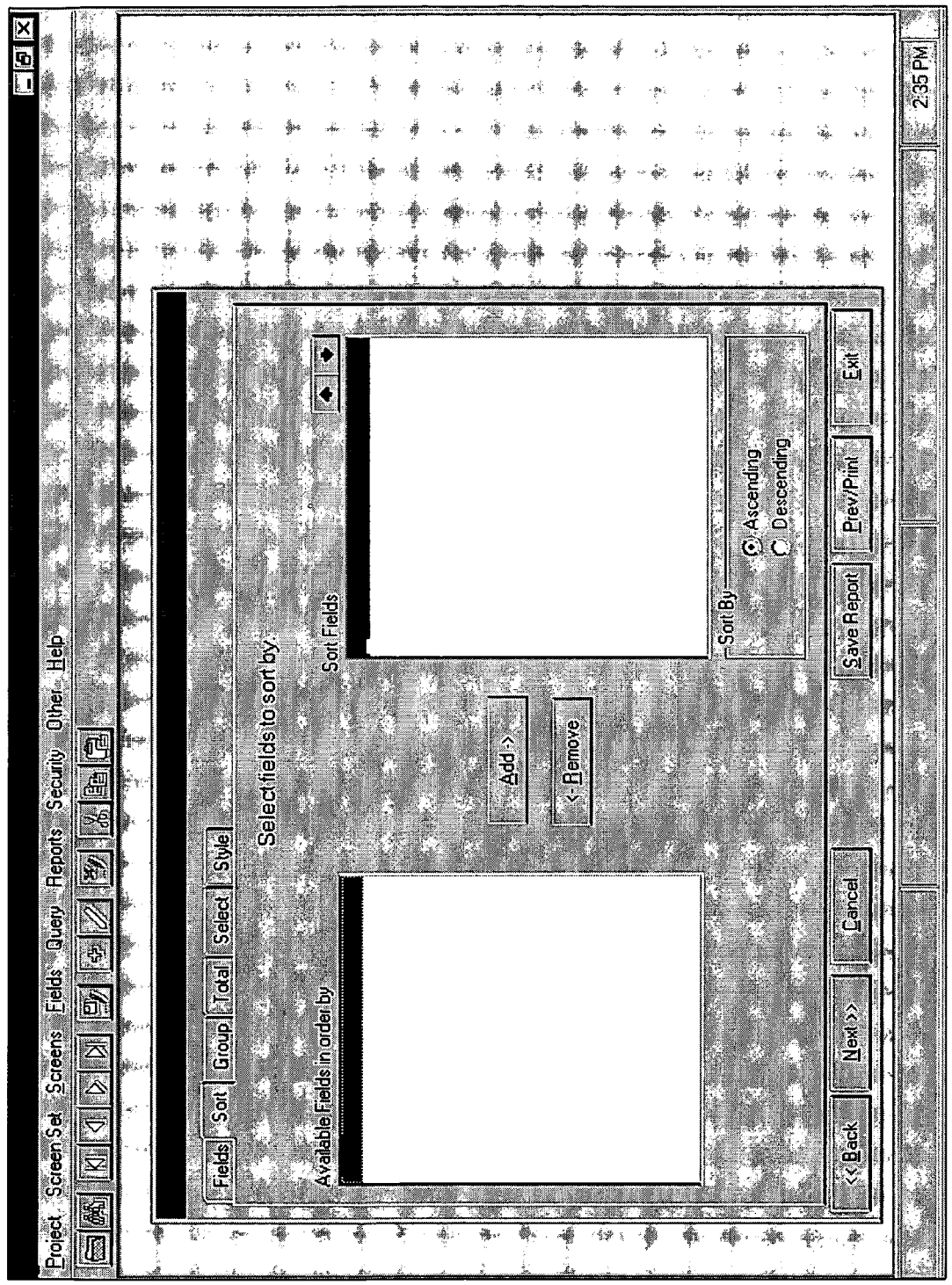
Figure 25:
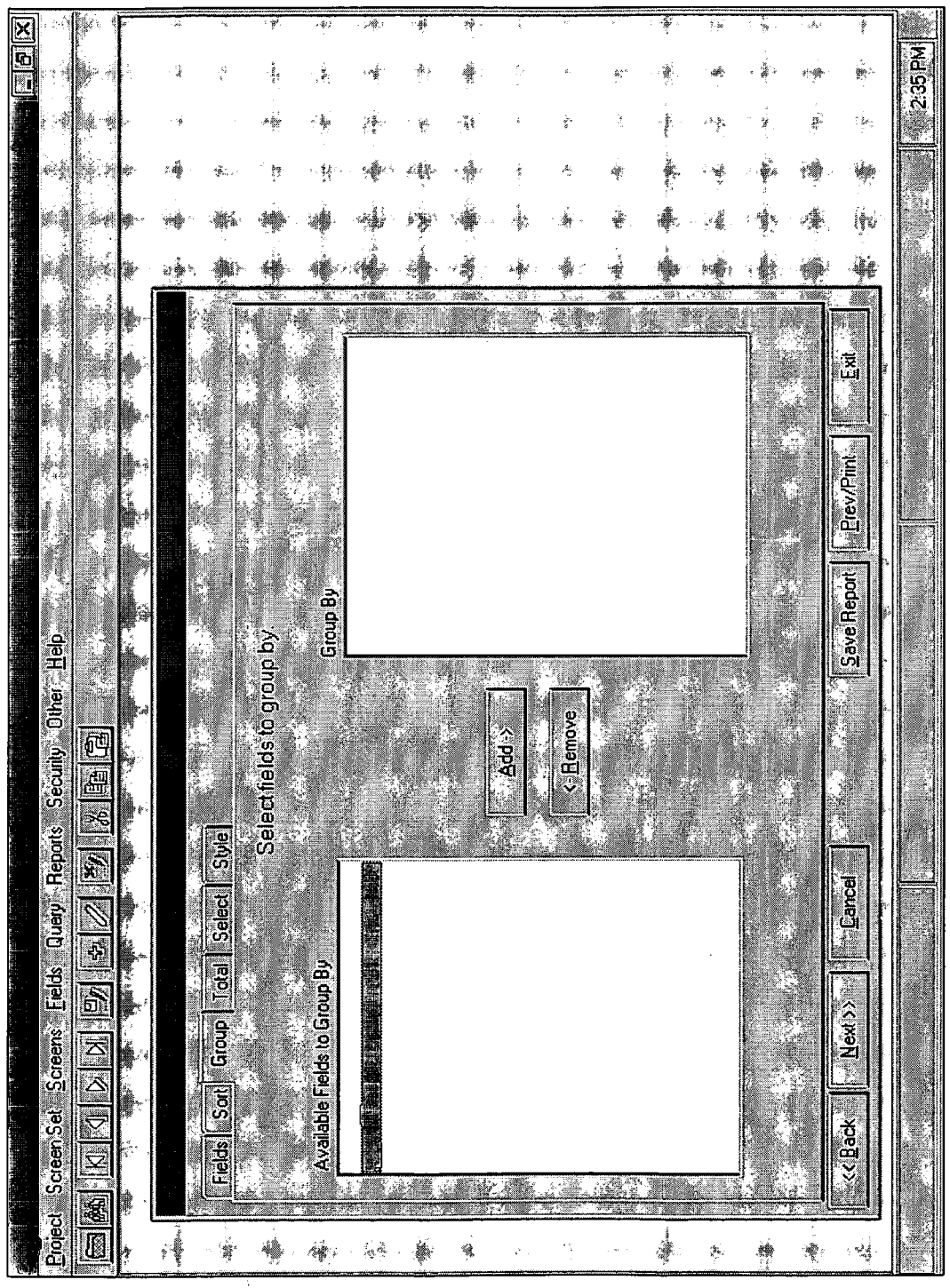
Figure 26:
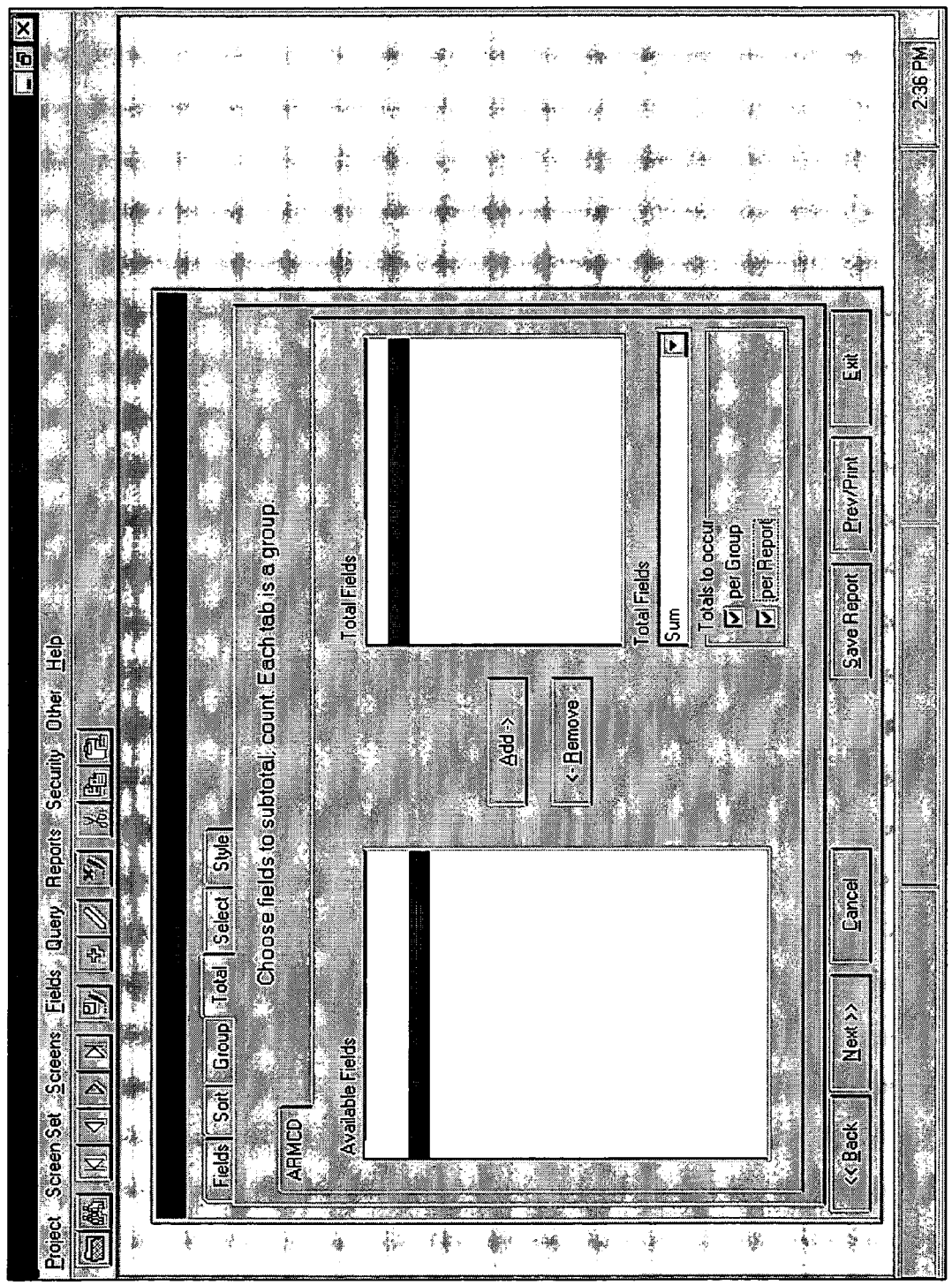
Figure 27:
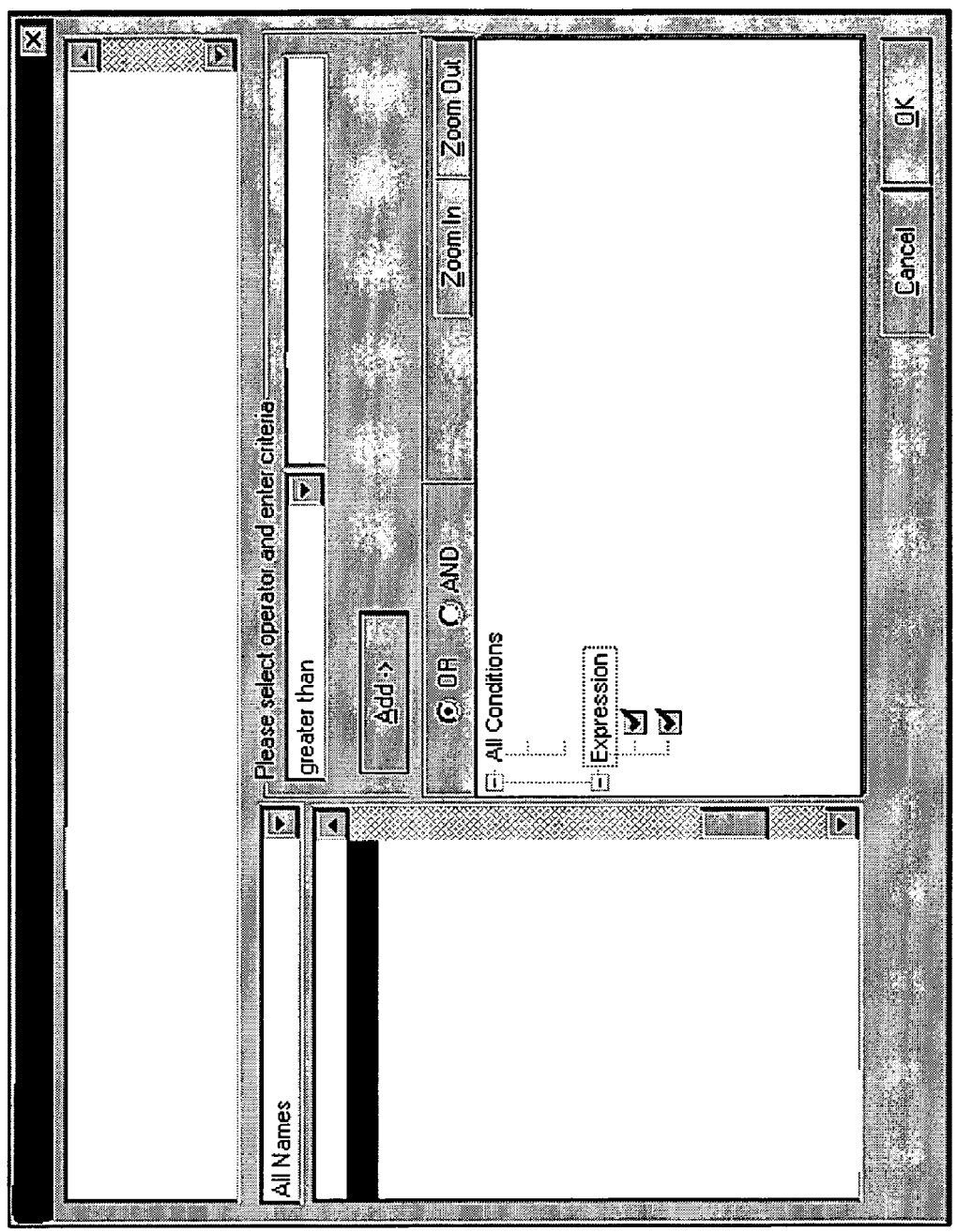
Figure 28:
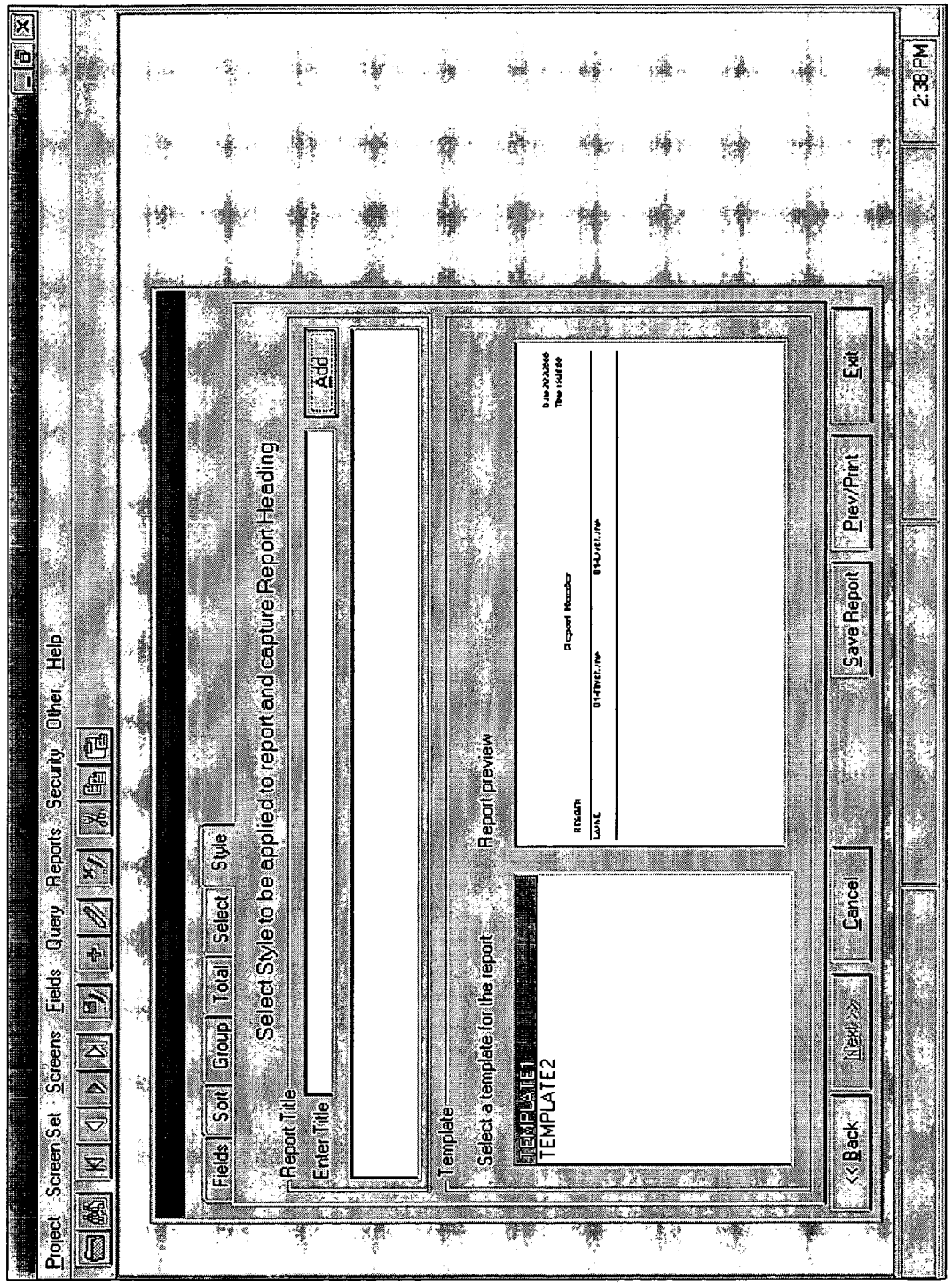

In the embodiment shown, the next operational function for the system builder component 12 concerns the system reports, as shown in FIG. 22. The end user can create new reports, import reports from an existing dictionary in another application into the new application, or edit (change) the characteristics of reports in an existing application or the imported reports. These functions are represented by blocks 182, 184 and 186, respectively. With respect to importing existing reports from existing applications, the user first selects the data dictionary source (another application) for the report (block 188) and then selects the particular report(s) to import (block 190) The imported reports will include all of the metadata attributes associated with those particular reports in the existing application. The report XML (extensible mark-up language) and the format information for the imported report are read by the system builder 12, as is the field information for the fields in the report XML. All the field information is then imported by the system builder and is entered into the data field information tables 45 and the report information tables 55.

The user may, as indicated above, also provide information to create a new report for the new application. The creation of a new report may be done in one of two ways. One is by virtue of a "report wizard" function, shown at block 194, which takes the end user through a sequence of selecting fields, ordering records, grouping records, defining totals and setting criteria for the record. The other method, indicated at block 198, is a conventional report writing component (referred to generally as a banded report writer) which arranges particular reports with preselected features in the report template in building component 12. In both cases, the fields, captions, particular calculations, headings, etc. which define the report are established by the end user.

This is shown at block 200. This information is then entered in the report information tables 55 of the data dictionary.

Figure 29:
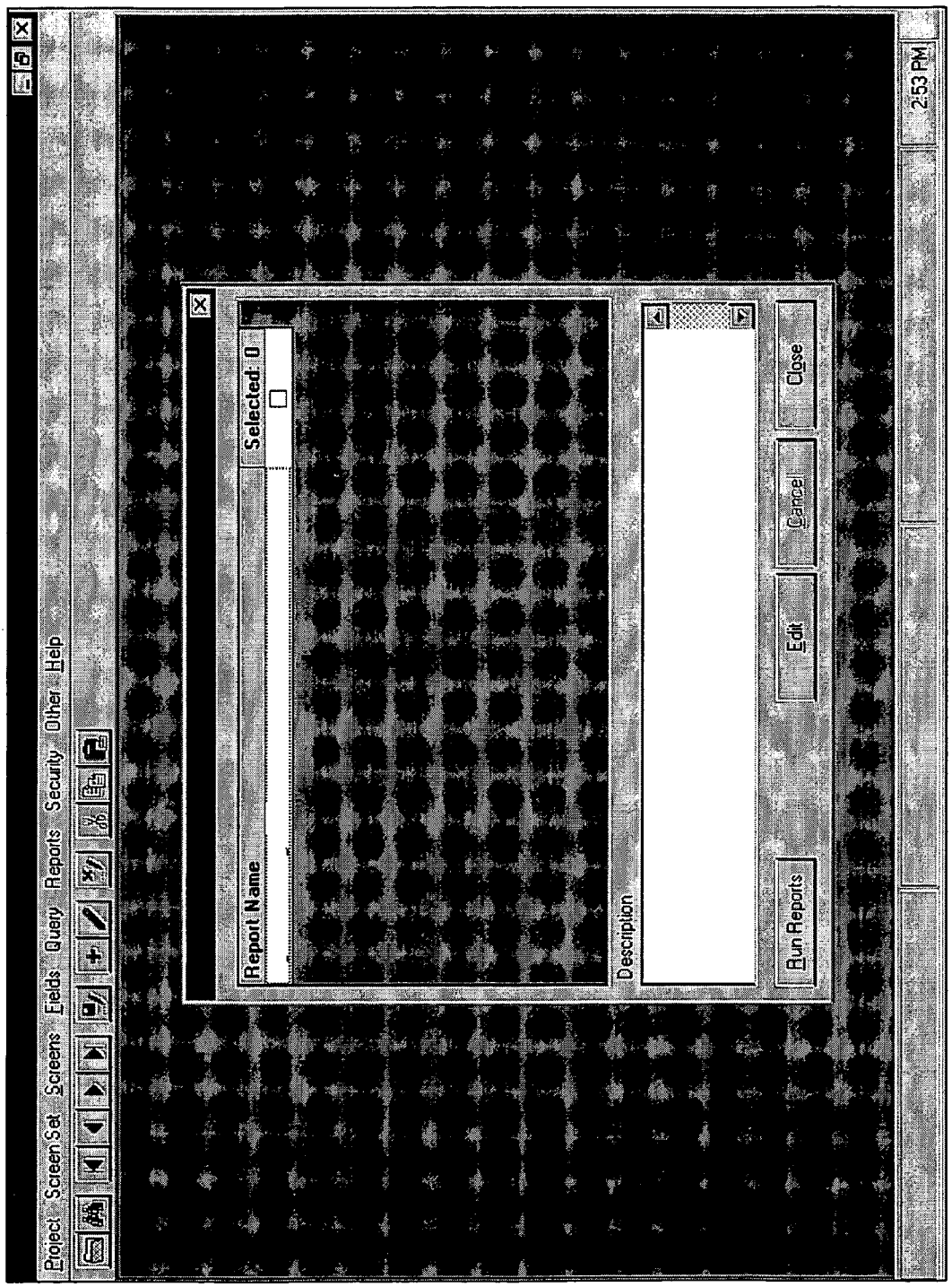

Editing of an existing report (of an existing application or an imported report) requires use of the same report functions (blocks 194 or 198). For editing, the user selects the particular report to edit, and the system builder component 12 opens the particular interface in which the report was originally created so that it can then be edited by the user. The interface screens for the report wizard are shown in FIGS. 23–28. FIG. 29 shows an interface screen for editing a report using the conventional report builder component.

The ability to create new reports with information provided by the user is quite significant, as in a standard system, there is no ability for the user to create new reports and integrate them into a new application or to import reports from another application into a new application.

When the user has finished defining or editing the metadata forming the data dictionary, the data collection database must be built. The user can elect to construct an entirely new database for the new application, or modify the structure of an existing database, which maintains any data currently resident in the tables of that database. This is desirable where there is a correlation between an existing database and the new application.

Figure 30:
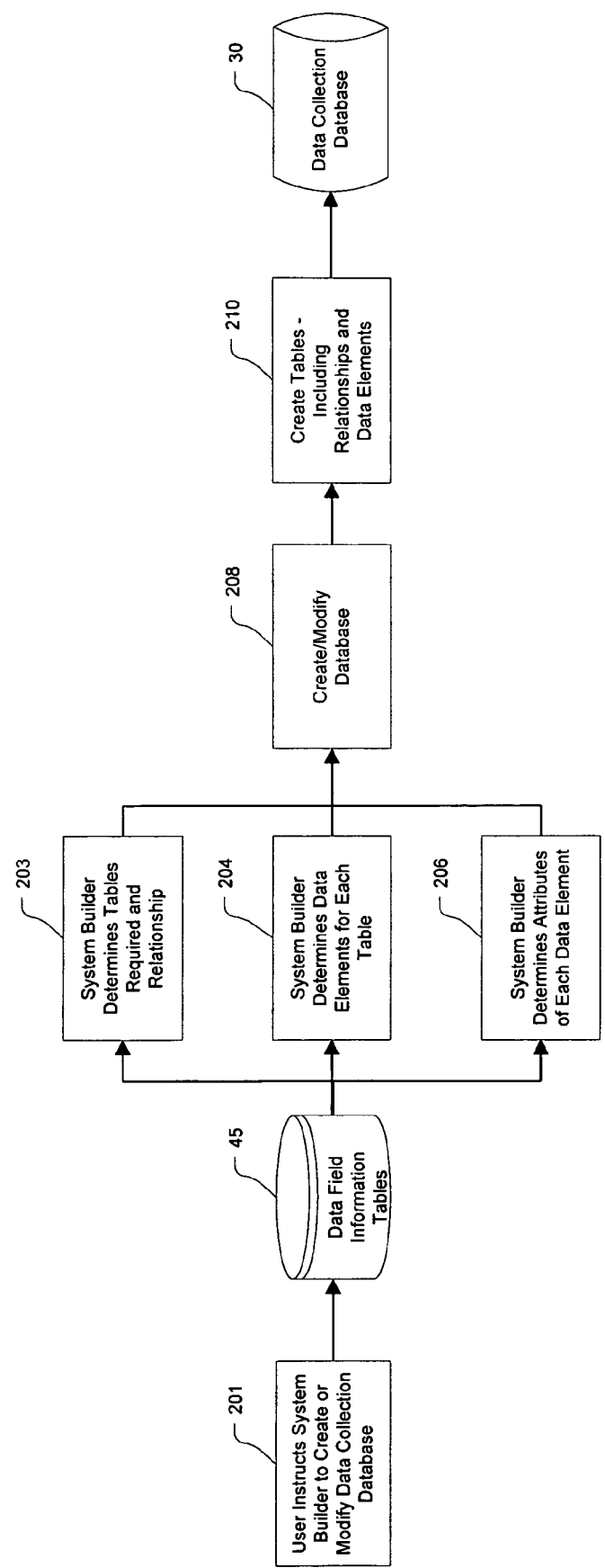
FIG. 30 is a flow chart for another portion of the system of FIG. 1.

Referring to FIG. 30, the system builder component 12 is first instructed by the user to create or modify the data collection database. This is shown in block 201. Using the data field information tables, as defined by the user, the system builder component 12 then determines the complete set of data tables required for the new application and assigns data elements and their attendant attributes, i.e. characteristics, to each table, as shown in blocks 203, 204 and 206, respectively. From this information, the data collection database itself is created (block 208). The various information tables comprising the database, including the relationships between the data and the data elements, are then created to produce the final data collection database, referred to at block 30. In a standard system, the creation of and/or modifications of a database structure is generally done manually by a skilled database administrator.

Figure 31:
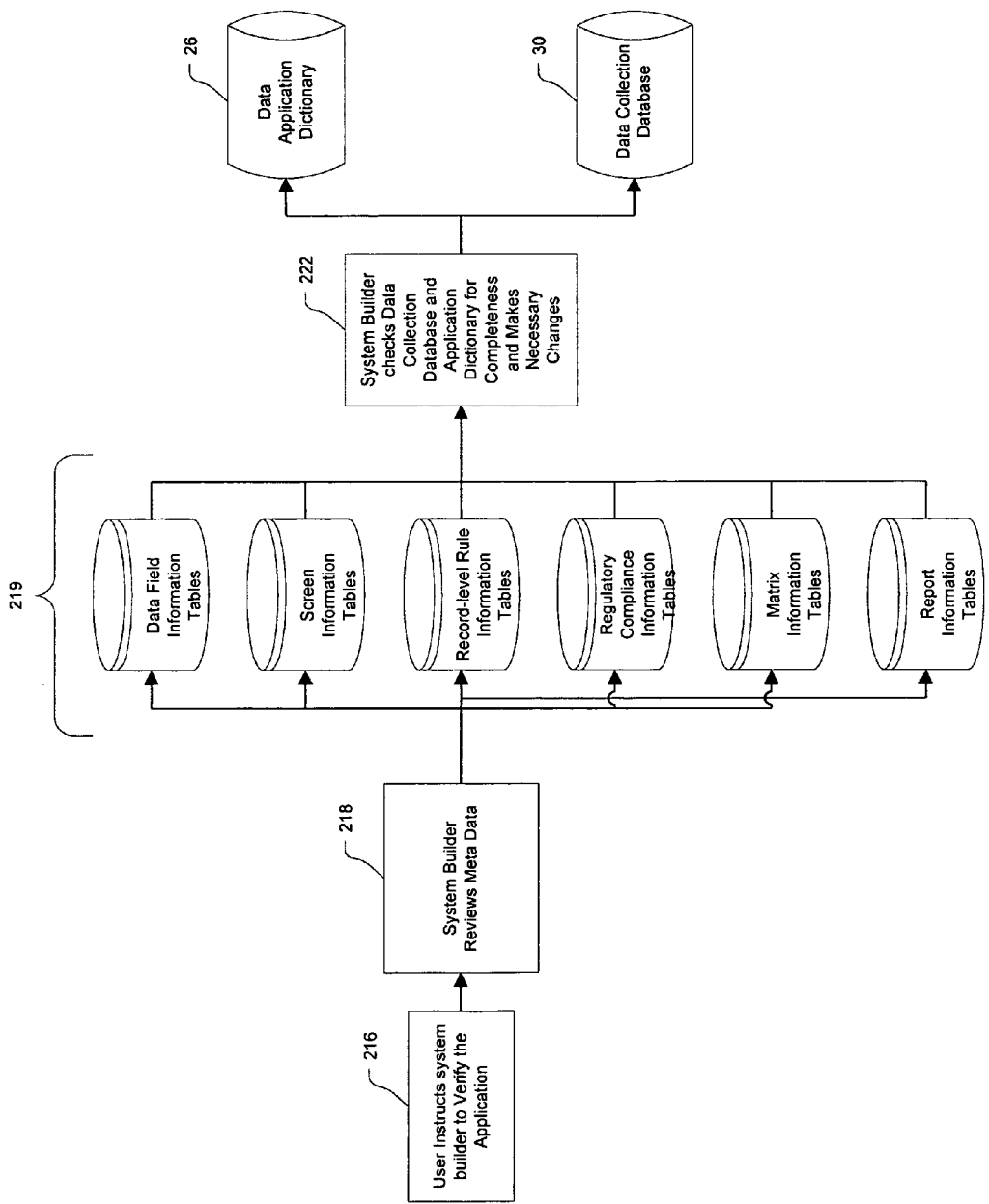
FIG. 31 is a flow chart for another portion of the system of FIG. 1.

FIG. 31 shows the final step for the user in creating or editing a new data collection application by the system builder component 12. In this portion of the system, the system builder component 12 verifies that all required fields, i.e. those fields for calculations, rules, screens, reports, etc. with their attendant look-up codes, are all present, that all components required for any special screen or field functions are included, and further, that the data collection database structure reflects the user-provided metadata for the fields and tables required.

In FIG. 31, the end user will first instruct the system builder component 12 to verify the new data collection application, i.e. all of the information/instructions which have been made during the building of the new application. This is shown in block 216. From there, the system builder component will review the metadata (block 218), specifically all of the metadata fields, including the data field information tables, the screen information tables, the record-level rule information tables, the regulatory compliance information tables, the matrix information tables and the report information tables, all identified as a group at 219. The system builder component 12 will then check both the data collection database and the data dictionary for completeness so that it can make any necessary modifications thereto, as shown in block 220. The application data dictionary 26 and the data collection database 30 are then modified, as required.

Figure 2:
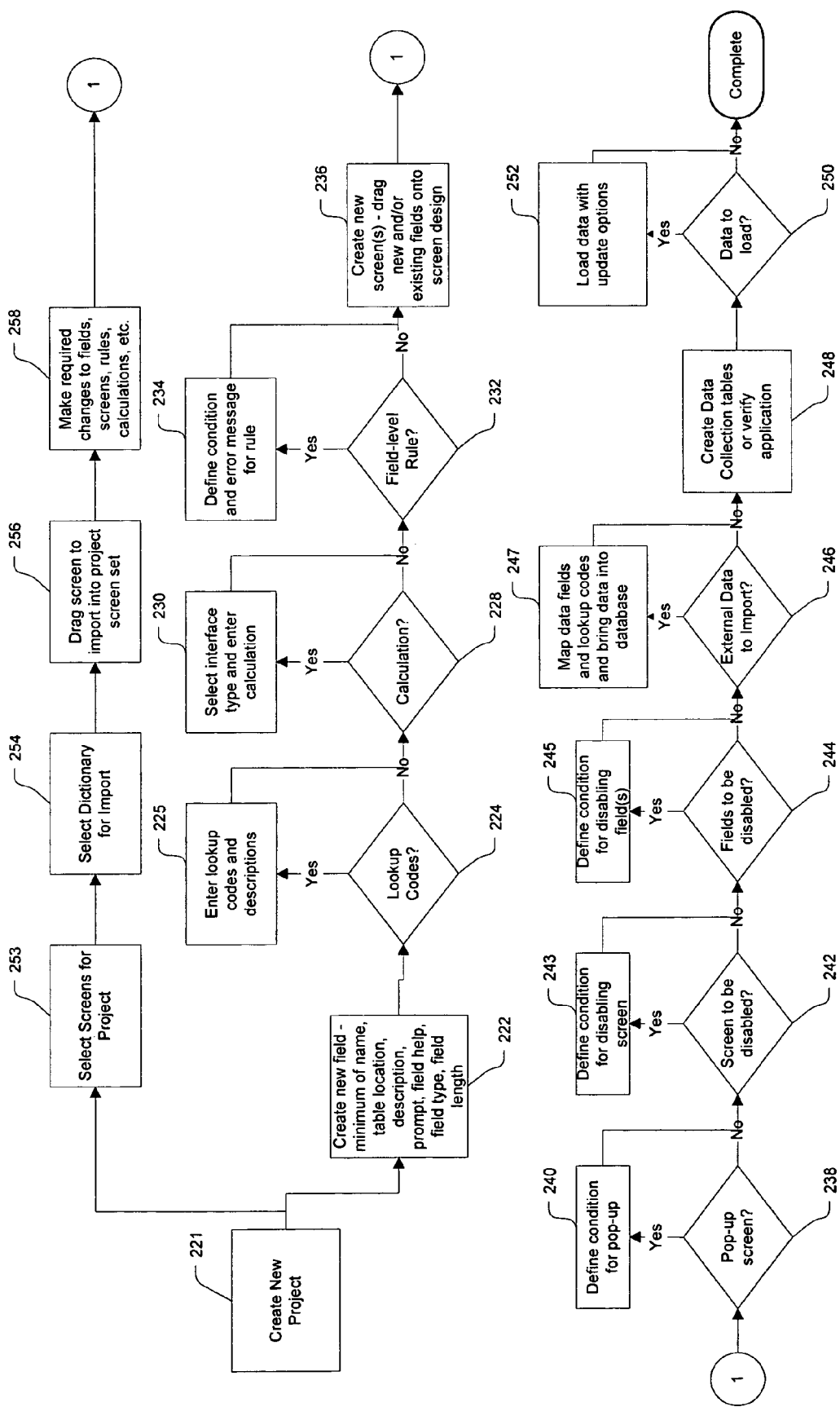
FIG. 2 is a simplified flow chart for a particular selected application.

FIG. 2 shows a simplified sequence of steps to create a new data collection application, referred to as a new project (block 221). Again, this is all user-provided information which will appear in metadata form. Examples of a new data collection application include mortgage record analysis and a document tracking system, among many others. A new field is created with name, table location, description, prompt and other information, as shown in block 222. Look-up codes are determined at block 224 and then are entered, as well as their description at block 225.

Next, it is determined whether any calculations are necessary within the application (block 228). If calculations are necessary, then the type of user interface and the particular calculation required are selected, as shown at block 230. The requirement for field level rules, if any, is then determined and the condition is defined as well as the error message for the rule, at blocks 232 and 234. Screen designs are then made accordingly, as shown by block 236. New and/or existing fields are dragged onto the screen design.

Pop-up screens, if any, are then identified and their conditions, at blocks 238 and 240. Next, the conditions, if any, under which the screen is to be disabled are determined, at blocks 242 and 243. The same determination is made for particular fields, as shown at blocks 244 and 245. Next, a determination is made as to whether particular field data, look-up codes, etc. need to be imported into the tables for the data collection application. If so, the importing is made, as indicated at blocks 246 and 247. The data fields and look-up codes are mapped and data is brought into the database.

Next, data collection tables are created or the entire application is verified (FIG. 31). The data is then loaded, either in wholesale fashion or selectively, as desired. The data is loaded with options and/or updates. These steps are shown at blocks 250 and 252. When the desired data is all loaded, the process is complete.

The screens for the new application must also be selected by the user (block 253) and the dictionary in another application must be selected for import into the new application (block 254) if, in fact, a screen is to be imported. The selected and imported screens are "dragged" into the application structure (block 256). Any necessary changes to the screens are accomplished (258). Information about the screens, referred to in blocks 238–245, is then requested and the functions of blocks 246–252 are accomplished. This completes a simple process for a particular new application.

FIGS. 32–36 show the second component of the system of the present invention, i.e. the system run-time component portion 14 which is present at the end user's site. This portion of the system interprets the metadata stored in the data dictionary so as to properly process the input data in accordance with the user's instructions, i.e. collecting, evaluating and analyzing the input data in accordance with the metadata provisions and rules. In the embodiment shown, the run-time component 14 itself has a certain amount of capability relative to adding or modifying existing business rules or reports. Changes to the data and screen structures can only be made via the system building component 12 in the embodiment shown, although it should be understood that this characteristic of the system could be changed.

Figure 32:
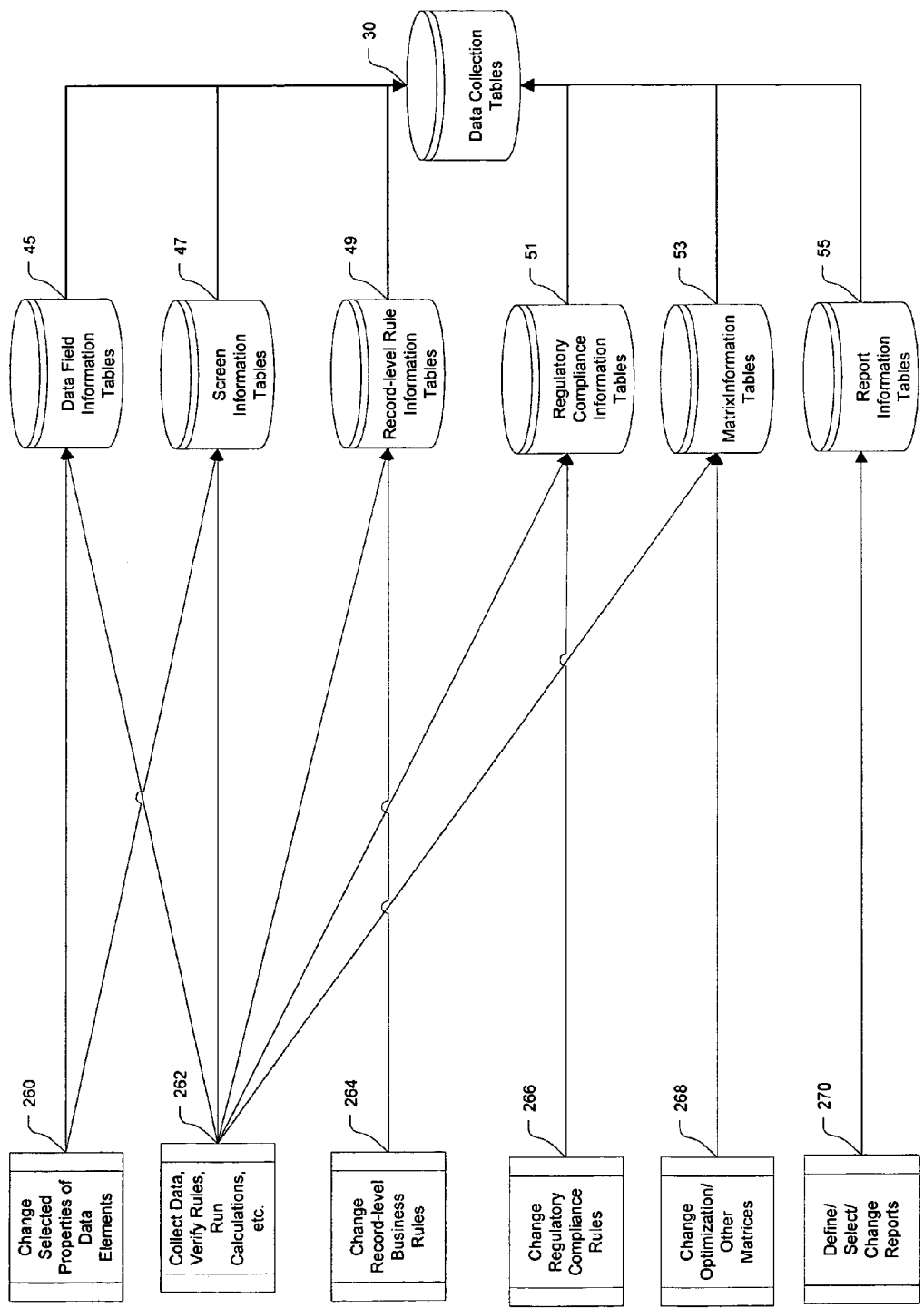
FIGS. 32–36 are flow charts for various portions of the second component of the system of the present invention.

FIG. 32 shows an overall summary of the run-time component. In the run-time component 14, selected properties (characteristics) of the data elements can be changed, as shown in block 260; data can be collected, calculations made and input data records analyzed in accordance with the various business rules in block 262; record-level business rules can be changed at block 264; regulatory compliance rules can be changed at block 266; matrix specifications can be changed at block 268; and reports can be modified at block 270.

Still referring to FIG. 32, but also referring to FIG. 3, the information in block 260 affects the data field information tables and the screen information tables, while the information from block 262 affects the data field information tables, the screen information tables, the record-level rule tables, the regulatory compliance information tables and the matrix information tables. Changes to record level business rules (264), regulatory compliance rules (266), matrix information (268) and reports (270) affect their corresponding information tables. All of the above individual tables form part of the data collection tables (283) which form the data collection database (30 in FIG. 1).

As discussed above, a primary function of the run-time component 14 is to permit entry of specific data (input data), in the form of records, such as information concerning a particular residential loan, and then to run the analyses and calculations involving the various business rules and compliance requirements relative to that record. However, as discussed above for FIG. 32, the run-time component also has, in the embodiment shown, the ability to make certain changes in the actual structure of the data collection application. This includes the ability to change certain attributes of the existing data elements, although new data elements cannot be added or deleted by the run-time component.

Figure 33:
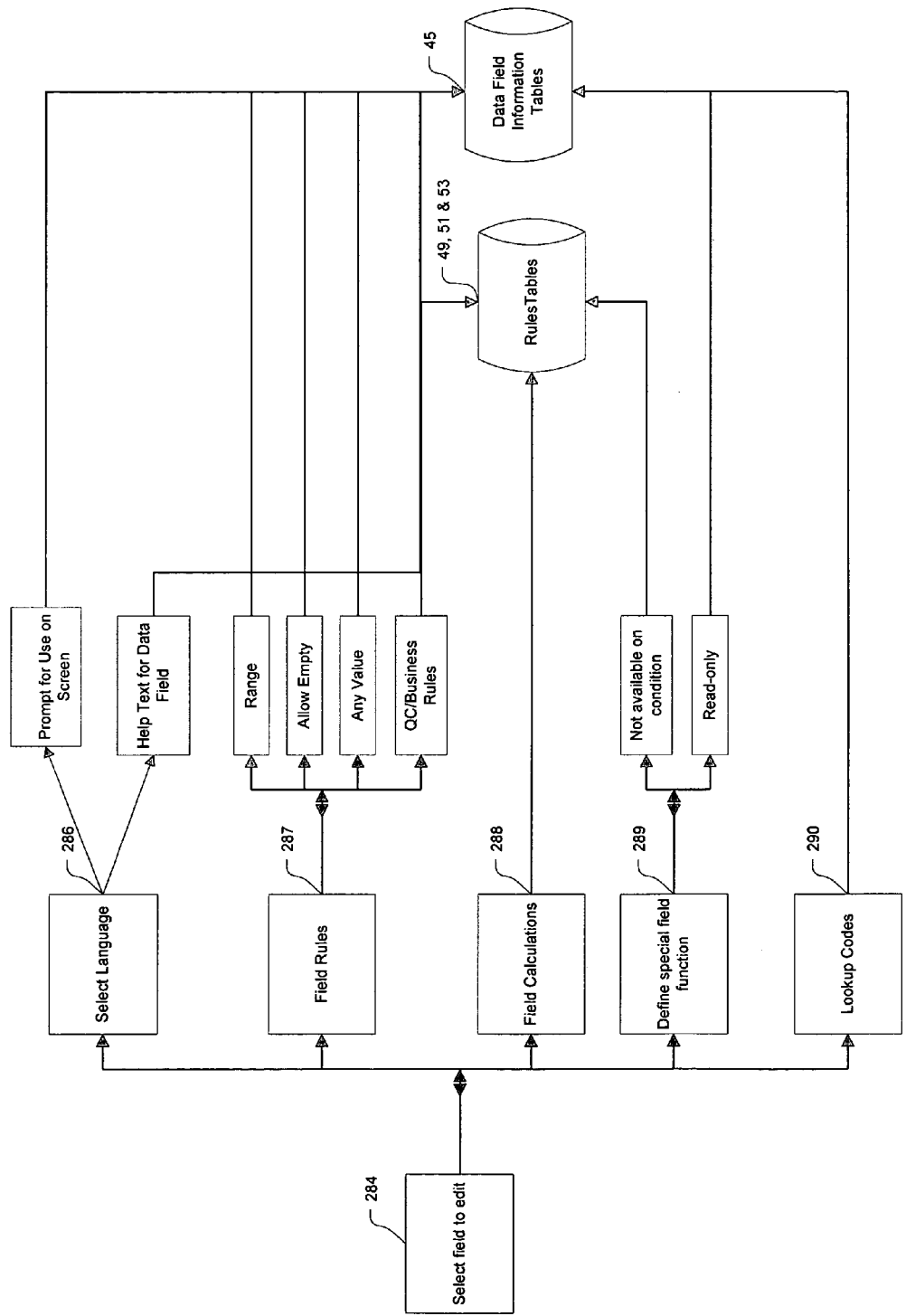

FIG. 33 shows the changes which are possible to the data elements by the run-time component. First, the particular data field to be changed/edited is identified, as shown in block 284. The various options available include selecting the language, modifying the field rules, modifying the field calculations, defining special field functions and establishing look-up codes, as shown at blocks 286–290. The modification capability for each of those possible categories of change is similar to that shown for similar categories in FIGS. 4 and 5 for the system builder component.

Figure 34:
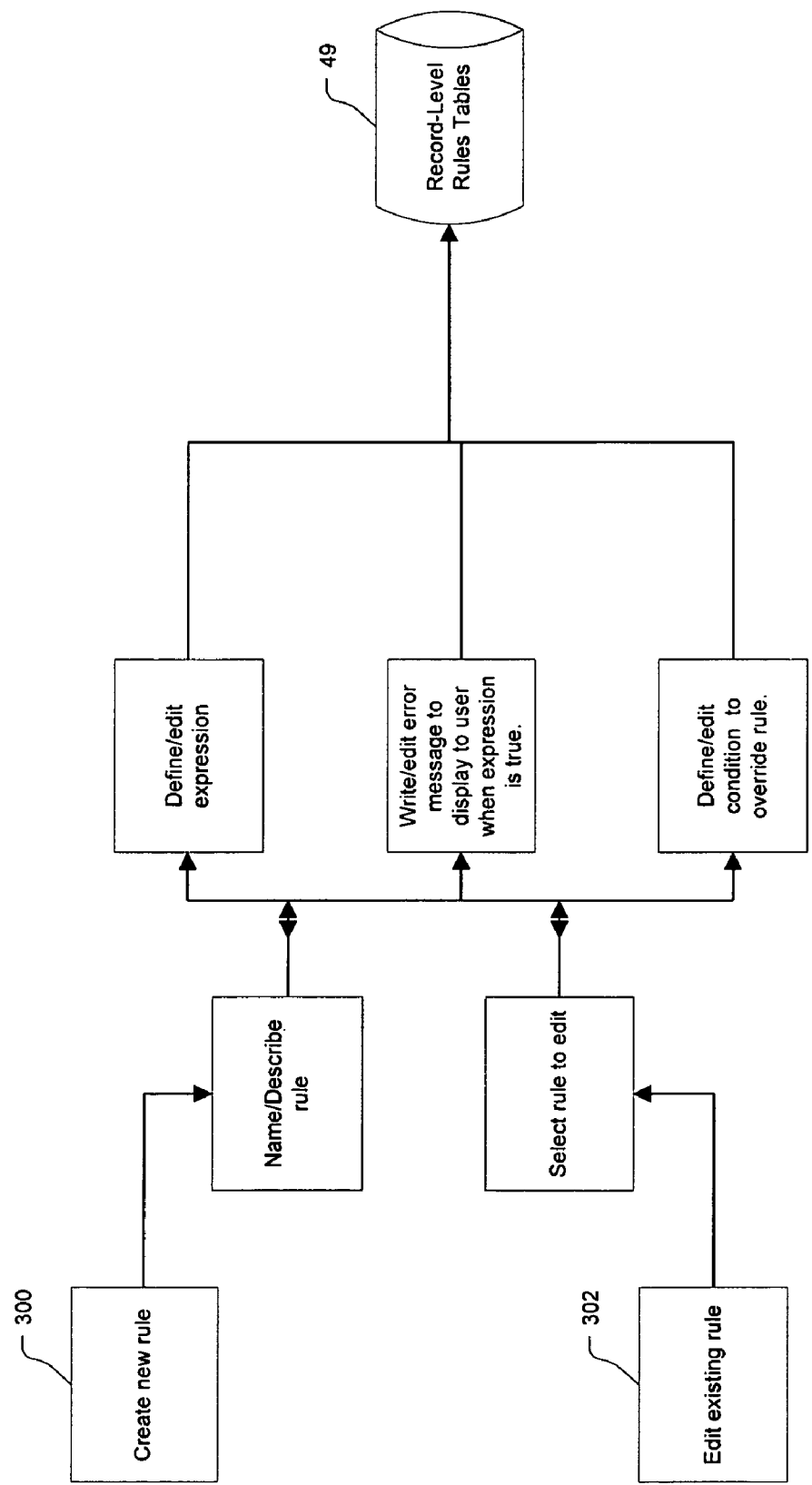

FIG. 34 shows the flow chart of that portion of the run-time component which permits changes in the record-level rules. New record-level rules can be created as well as editing of existing rules, as shown at blocks 300 and 302. The information required for the end user to accomplish the new rules and the editing of existing rules is similar to FIG. 13 for the system builder component.

With the run-time component 14, new compliance rules can be created or existing rules changed. The procedure is the same for that shown in FIG. 14 for the system builder component. The same is true for the functions of creating a new matrix of specifications and/or editing an existing matrix, which is shown in FIG. 18.

Figure 35:
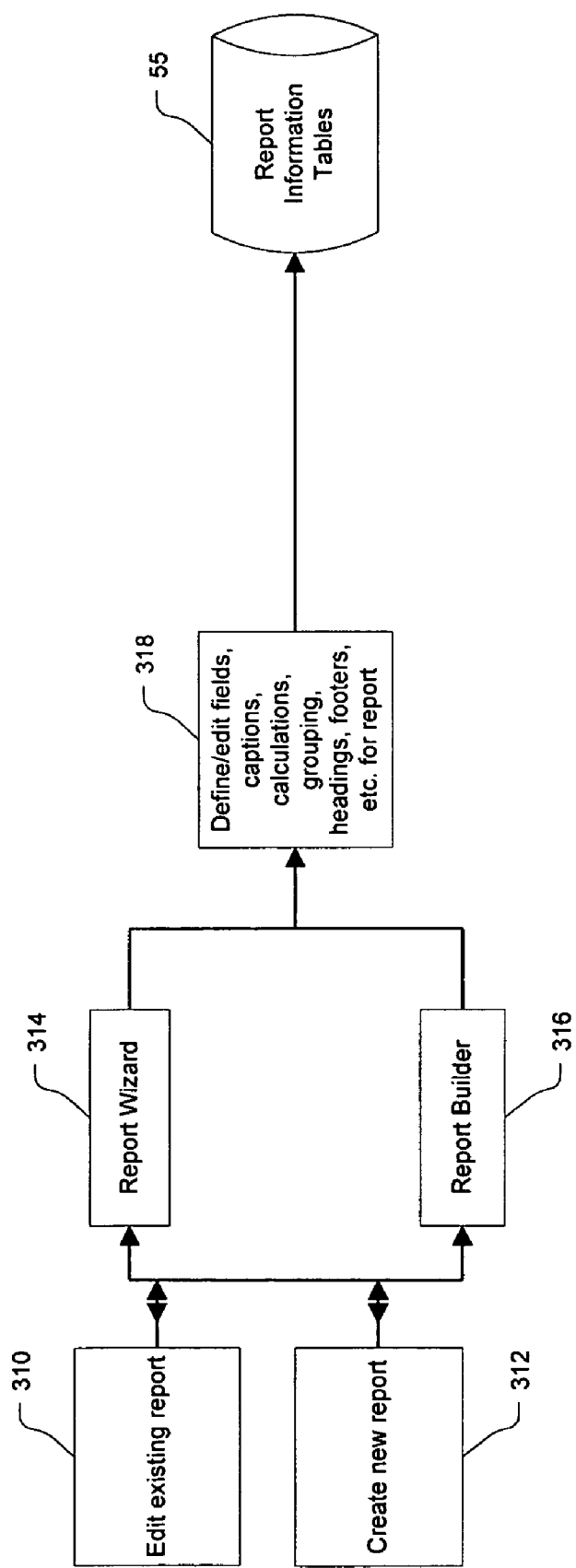

In FIG. 35, existing reports may be edited or new reports created by the run-time component 14 at the user's facility. This is represented at blocks 310 and 312. The reports can be edited or created using a report wizard, block 314, or a report builder, block 316. These were explained above relative to FIG. 22 for the system builder component 12.

The report wizard and the report builder both define the edit fields, captions, calculations, groupings and headings for the report, as shown at block 318. The report tables receive this information. The run-time component 14 cannot, however, in the embodiment shown, import existing reports from other applications, although it could be easily modified to permit such a function.

Figure 36:
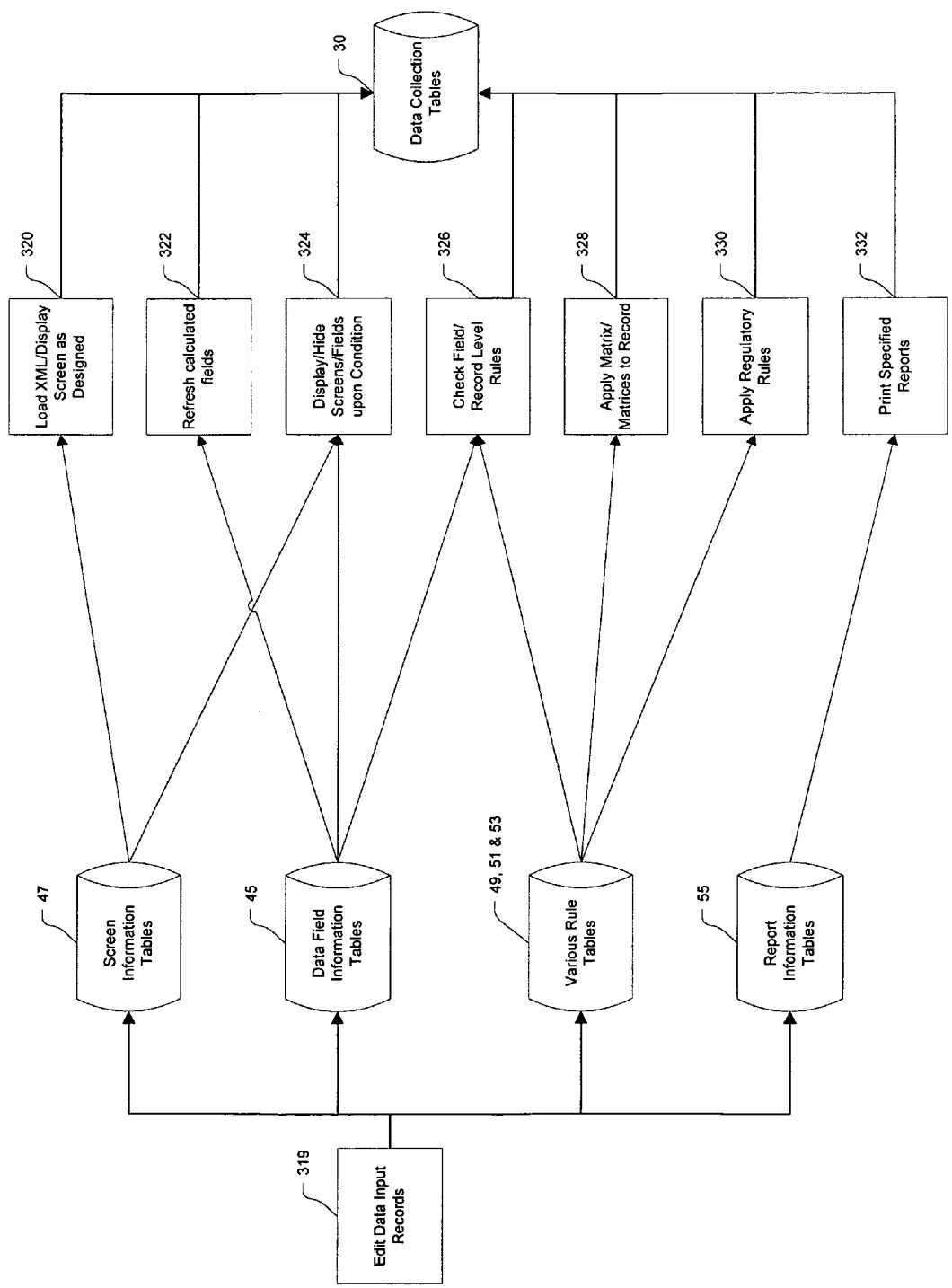

FIG. 36 shows the application of the metadata tables (blocks 45, 47, 49, 51, 53 and 55) relative to the actual input data provided by the end user. Specifically, with the run-time component 14, the display screen can be loaded (block 320), calculated fields can be refreshed (block 322), fields can be displayed or hidden upon certain conditions (block 324), and field rules and record-level rules can both be checked (block 326). The matrices can be applied to the input data records as can the regulatory rules (blocks 328 and 330), while specified reports can be printed in block 332.

Information to perform the actions in block 320 is obtained from the screen information tables (47); information to perform the actions in block 322 is obtained from the data information tables (45); information to perform the actions in block 324 is obtained from the screen information tables (47) and the data field information tables (45); information to perform the actions in block 326 is obtained from the data field information tables (45) and the various rules tables, while information to perform the actions in blocks 328, 330 and 322, respectively, is obtained from the various rules tables (for both 328 and 330) and the report information tables (55). All the blocks perform the stated actions on data records stored in the data collection tables.

One particular feature of the present invention concerns the XML document. Input screens in the present system are stored in the form of XML documents and their associated components (i.e. schemas, XSL style components, etc.). The system builder component 12 uses a visual interface to assist the user in creating/editing the XML document and its associated components.

When creating a new input screen, the system builder 12 presents a form that looks like a blank input screen. The user can select data elements from the current application or from another system builder application. To add a data element to the screen, the user simply locates the element from the list available and drags it onto the form for the document. The system builder 12 reads the various properties of the element from the dictionary (size, types, whether it has look-up codes, whether it involves calculation, etc.), displays the appropriate data entry control (combo box for fields with look-up codes, date box for date fields, etc.) in the location indicated by the user, and adds to the XML documents the appropriate tags for the data element, its location on the form, its associated control, and its properties. When the resulting input screen design is saved, the system builder 12 stores the XML document in the screens tables in the data dictionary.

In editing an existing input screen, the system builder 12 opens the XML document from the screens table in the data dictionary and parses it for display as an input screen in the design form. The user then can add fields (from this or another system builder application), delete fields, modify field properties, etc. The system builder 12 captures the changes and makes the required modifications to the tags and values in the XML document, schema, XSL, etc. When the resulting edited input screen design is saved, system builder 12 stores the XML document on the screens table in the dictionary.

The run-time component 14 displays the input screen by parsing the XML document and displaying it, based on the tags and properties contained in the XML document.

This completes the description of the present system, which is capable of producing new custom data collection applications for an end user, without the necessity of having to generate new code for each new application. The system is divided into two basic components, one a system building component, the other a system run-time component. The system uses input information from the end user to develop what is known as metadata, i.e. information about data, which is stored in a data dictionary database. Relevant input data for the new application is provided to the run-time component by the end user and the data is processed by the run-time component in accordance with the processing structure established by the system building component.

The input data provided by the end user is stored in a data collection database. The processing structure, including the data elements, the screens, the compliance and matrix rules, and the report structure are all established through end user input information, by the system building component. The end user information is provided to the system building component through the use of interface screens and related prompts. Existing application structure can be edited both through the system building component and the system run-time component.

Although a preferred embodiment has been disclosed for purposes of illustration, it should be understood that various changes, modifications and substitutions may be made to the invention without departing from the spirit thereof, which is defined by the claims which follow:

What is claimed is:

1. A software system embodied on a computer-readable medium for developing new computer-based data collection applications, comprising:
   a first software program function for developing an information structure for a selected new data collection software application, the information structure including information concerning several components thereof which include data elements, data screens and rules for processing data and performing calculations thereon, said information being supplied by an end user of the data collection software application;
   means for developing and maintaining a data storage database for input data which is provided by an end user for the data collection software application, wherein the input data is processed in operation of the new data collection software application; and
   a second software program function for interpreting and accessing the information structure for processing the input data in accordance with the information structure developed by the first software program function, wherein the second software program function has the capability of modifying selected characteristics of the information structure in accordance with the end user's instructions.

2. A system of claim 1, wherein the components further include (1) information about compliance with legal requirements, (2) matrix information which includes standards concerning the application of the data, and (3) information concerning the form and content of reports for the new application.

3. A system of claim 2, wherein the matrix information includes guideline information against which the input data is compared.

4. A system of claim 2, wherein the first program function includes the capability of creating new reports for the data collection application, editing existing reports and storing said reports as metadata.

5. A system of claim 2, wherein the input data is in the form of data records and the first program function includes the capability of defining compliance characteristics of each input data record relative to preselected legal requirements including defining questions provided to the end-user to determine compliance of the data record with the preselected legal requirements.

6. A system of claim 2, wherein the first program function includes the capability of defining the following characteristics of the reports: fields, calculations to be performed and format.

7. A system of claim 2, wherein the second program function includes the capability of creating new matrix information and editing existing matrix information, including defining conditions under which the matrix rules for evaluating data records are overridden.

8. A system of claim 1, wherein the information structure is in the form of metadata stored in a data dictionary portion of the information structure, the data dictionary comprising information provided by the end user which is thereafter accessible to the end user for selected modification.

9. A system of claim 8, wherein the first program function includes the capability of reviewing all of the information provided by the user relative to the information structure and for verifying the information structure therefrom.

10. A system of claim 1, wherein the first program function includes the capability of creating new definitions of portions of the information structure components as well as modifying existing definitions thereof.

11. A system of claim 10, wherein the first program function includes the capability of adding to at least one information structure component of the new application information imported from another application.

12. A system of claim 1, wherein the processing rules include field-level rules and record-level rules.

13. A system of claim 1, wherein the second program function includes the capability of editing the existing data elements and data screens but is not capable of adding new data elements or screens to the information structure.

14. A system of claim 1, wherein the first program function has the capability of affecting a plurality of characteristics of the data elements, including information about the fields, the field rules and the field calculations involving the data elements.

15. A system of claim 1, including a plurality of interface screens which prompt the end user to enter information necessary for developing the information structure of the new data collection application.

16. A system of claim 15, wherein the first program function permits the user to select fields for data screens, create labels and the format for the data screens and define particular screen functions.

17. A system of claim 16, wherein the first program function has the capability of editing data screens in existing data collection applications and importing data screens from another data collection application available to it for use in the new data collection application.

18. A system of claim 1, wherein the first program function uses a visual interface with the end user to create an XML document.

19. A system of claim 1, wherein the first program function has the capability of creating new processing rules and editing existing processing rules.

20. A system of claim 19, wherein the rule creating/editing capability of the first program function includes the capability of defining how a rule is expressed, creating an error message when the expression of the rule is true concerning the data, which indicates that the rule has been violated, and defining the conditions under which a rule may be overridden.

21. A system of claim 1, wherein the input data is in the form of data records and wherein the second program function includes the capability of defining compliance characteristics of each input data record relative to preselected legal requirements including defining questions provided to the end user to determine compliance of the data record with the preselected legal requirements.

22. A system of claim 1, wherein the input data is in the form of data records and wherein the second program function includes the capability of evaluating input data records against a selected matrix specification and selected conditions under which the matrix rules can be overridden.

23. A system of claim 1, wherein the second program function includes the capability of changing the data elements, the data screens and the record-level rules but cannot add new data elements or data screens to the information structure.

24. A system of claim 1, wherein the input data is in the form of data records and wherein the second program function includes the capability of creating new data record-level rules and field-level rules, and editing existing data record-level rules and field-level rules in existing applications, and also includes the capability of defining each rule, applying the rule to the data records and displaying an error message when the defined rule is true for a data record, which indicates that the rule has been violated, and for establishing conditions under which the record-level rules and the field-level rules may be overridden.

25. A system of claim 1, wherein the second program function has the capability of creating new reports for the data collection application, editing existing reports and storing said reports as metadata.

26. A system of claim 1, wherein the second program function is located on a server at a site of the end user, while the first program function is at a site remote from the end user's site.

27. A software system embodied on a computer-readable medium for developing screens used in a new computer program application, which includes obtaining screens from another application, including:

a first software program function providing an end user an opportunity to select a desired screen from another application to which the software system has access and for importing said desired screen for use in the new application, wherein the first program function permits the user to drag the desired screen into a selected screen set for the new application; and another software program function which reads the information tables for said desired screen and brings into the new application a XML (extensible mark-up language) document associated with said desired screen, said another software program function thereafter storing said desired screen and the associated XML document in selected information tables for said new application.

28. A system of claim 27, including means within said another software program function for reading data fields associated with said desired screen in said another application and for importing and storing substantially all said data fields in the new application.

29. A system of claim 28, wherein said another software program function includes the capability of obtaining processing rules and calculations associated with said data field information and for importing and storing them into the new application.

* * * * *